United States Patent
Barcey et al.

(10) Patent No.: US 10,468,871 B2
(45) Date of Patent: Nov. 5, 2019

(54) DISTRIBUTION BLOCK WITH INTEGRATED SURGE PROTECTIVE DEVICE

(71) Applicant: ERICO INTERNATIONAL CORPORATION, Solon, OH (US)

(72) Inventors: Christian Barcey, Streetsboro, OH (US); Thomas Bendlak, Macedonia, OH (US); Thomas Bockstoce, Akron, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 337 days.

(21) Appl. No.: 15/602,010

(22) Filed: May 22, 2017

(65) Prior Publication Data
US 2017/0338649 A1    Nov. 23, 2017

Related U.S. Application Data

(60) Provisional application No. 62/339,552, filed on May 20, 2016.

(51) Int. Cl.
*H02H 9/00* (2006.01)
*H02H 9/04* (2006.01)
(Continued)

(52) U.S. Cl.
CPC ............. *H02H 9/005* (2013.01); *H01T 4/06* (2013.01); *H02B 13/00* (2013.01); *H02H 9/044* (2013.01); *H02H 9/045* (2013.01)

(58) Field of Classification Search
CPC ........ H02H 9/005; H02H 9/044; H02H 9/045; H01T 4/06; H02B 13/00
See application file for complete search history.

(56) References Cited

U.S. PATENT DOCUMENTS

| 3,835,439 A | 9/1974 | Yonkers |
| 5,606,299 A | 2/1997 | Innes et al. |

(Continued)

FOREIGN PATENT DOCUMENTS

| EP | 2919254 A1 | 9/2015 |
| KR | 20050120316 A | 12/2005 |

(Continued)

OTHER PUBLICATIONS

Eaton; SPD Series surge protection; retrieved from the Internet; 1 page.

(Continued)

*Primary Examiner* — Scott Bauer
(74) *Attorney, Agent, or Firm* — Quarles & Brady LLP

(57) ABSTRACT

A modular distribution block for a high-current power system includes a ground module and one or more phase modules. The ground module includes a grounding clamp configured to electrically and mechanically connect to a DIN rail and to retain the distribution block in place with respect to the DIN rail. The phase module(s) include: a conductive splice block that connects a line current from a power supply to a powered device; and, a first surge protective device (SPD) terminal and a second SPD terminal configured to together receive and electrically connect to an SPD module, such connection forming a surge protection circuit within the distribution block, the first SPD terminal electrically connecting to the bus terminal and the second SPD terminal electrically connecting, to the splice block. A rigid bus bar electrically connects the ground module to the phase module(s).

20 Claims, 23 Drawing Sheets

(51) Int. Cl.
*H01T 4/06* (2006.01)
*H02B 13/00* (2006.01)

(56) References Cited

U.S. PATENT DOCUMENTS

| | | | |
|---|---|---|---|
| 5,825,598 | A | 10/1998 | Dickens et al. |
| 6,380,862 | B1 | 4/2002 | Karim et al. |
| 6,411,486 | B1 | 6/2002 | Doneghue |
| 7,052,333 | B2 | 5/2006 | Siracki et al. |
| 7,134,921 | B2 | 11/2006 | Siracki et al. |
| 7,616,420 | B2 | 11/2009 | Slater et al. |
| 8,116,058 | B2 | 2/2012 | Qin et al. |
| 8,727,797 | B2 * | 5/2014 | Parrish ............... H02B 1/052 439/94 |
| 8,730,638 | B2 * | 5/2014 | Higashi ............ G01R 31/1236 361/117 |
| 9,812,858 | B2 * | 11/2017 | Kawabata ................ H01C 7/12 |
| 2007/0291430 | A1 | 12/2007 | Spitaels et al. |
| 2008/0019071 | A1 | 1/2008 | Hansen et al. |
| 2008/0284614 | A1 * | 11/2008 | Perez ................ G01R 22/065 340/870.02 |
| 2013/0135777 | A1 | 5/2013 | Tang et al. |
| 2014/0065863 | A1 * | 3/2014 | Bodmann ............ H05K 7/1468 439/153 |
| 2015/0229065 | A1 | 8/2015 | Buehman et al. |
| 2015/0349523 | A1 | 12/2015 | Tsovilis et al. |
| 2016/0126728 | A1 | 5/2016 | Kawabata |
| 2017/0311462 | A1 * | 10/2017 | Kamensek ........... H01H 71/025 |

FOREIGN PATENT DOCUMENTS

| | | |
|---|---|---|
| KR | 20140017235 A | 2/2014 |
| KR | 101482191 B1 | 1/2015 |

OTHER PUBLICATIONS

Eaton: AEGIS Series surge protection; Copyright 2015 Eaton; retrieved from the Internet; 8 pages.
Rockwell Automation; Bulletin 4983 Introducing Surge & Filter Protection; Copyright 2010 Rockwell Automation; retrieved from the Internet; 8 pages.
Phoenix Contact; Surge protection for power supply units; Copyright 2017 Phoenix Contact; retrieved from the Internet; 13 pages.
Phoenix Contact; Interference filters; Copyright 2017 Phoenix Contact; retrieved from the Internet; 2 pages.
Pentair Electrical & Fastening Solutions; ERICO Transient Discriminating Surge Diverter, 50 KA TNC System; Copyright 2017 Pentair; retrieved from the Internet; 2 pages.

* cited by examiner

DISTRIBUTION BLOCK WITH INTEGRATED SURGE PROTECTIVE DEVICE

BACKGROUND

A surge protective device (SPD), or surge protector, is an electrical device connected between a power source and a device being powered by the power source, which is configured to limit the voltage supplied to the powered device. In the event of a power surge, the SPD intercepts any voltage above a threshold safe/operating amount, known as the clamping voltage, and redirects the surge current. In industrial applications, SPDs are typically "shunt mode" protective devices, using electrical components (e.g., varistors) that let operating voltages pass through and become conductive above the clamping voltage. Once conductive, the components direct the transient voltage toward ground or otherwise away from the powered devices. These components are connected in parallel with the powered load so as not to disrupt normal current flow to the powered device. Some SPDs are sacrificial—the components can only withstand a limited number of surges before degrading to the point of failure, and must be replaceable.

Traditionally, SPDs are a separate component from any distribution or power blocks. The main function of the distribution or power block is to provide the power to the load; the main function of the SPD is to clamp the voltage as described. In a typical system, the SPD is electrically connected in parallel to the output side of the distribution or power block, and spaced away from the distribution block. This can result in impaired surge protection levels due to the extra wire lengths connecting the SPD to the protected equipment. An integrated SPD and distribution block would advantageously eliminate these excess wires while handling high current draws which are typical in industrial settings.

SUMMARY

Some embodiments of the invention provide an integrated distribution or power block and surge protective device invention involves combining the distribution or power block and surge protective device into a single device. In doing so, the device performs the main function of both separate devices. The integrated device reduces or eliminates the wire lengths between the surge protective device and the equipment, improving surge protection levels. The integrated device can be modular to facilitate customization of industrial power distribution/surge protection systems. The integrated device can use existing, replaceable surge protection modules in sacrificial systems.

In one aspect, the present disclosure provides an apparatus for distributing power and providing surge protection in a high-current power system. The apparatus includes a ground module and a plurality of power phase modules each configured to conduct one phase of a polyphase electric current. The ground module includes: a first housing; an electrically conductive grounding clamp disposed in the first housing and configured to electrically and mechanically connect to a DIN rail; and, a grounding terminal electrically connected to the grounding clamp. Each of the plurality of power phase modules includes: a second housing that mechanically retains a corresponding surge protective device (SPD) module of a plurality of SPD modules; an electrically conductive first splice block disposed in the second housing and configured to electrically connect to an input side conductor that carries the corresponding phase of the polyphase electric current, and to an output side conductor that carries current to a powered device; a first SPD terminal integral with the first splice block and configured to electrically connect to the corresponding SPD module retained by the second housing; a bus terminal disposed in the second housing and electrically isolated from the first splice block; and, a second SPD terminal disposed in the second housing, electrically connected to the bus terminal, and configured to electrically connect to the corresponding SPD module retained by the second housing to form a surge protection circuit within the apparatus.

The apparatus further includes an electrically conductive, rigid first bus bar attachable to the grounding terminal and to the corresponding bus terminal of each of the plurality of power phase modules to connect the corresponding surge protection circuit of each of the plurality of power phase modules to ground. The first bus bar may removably attach to the grounding terminal and the corresponding bus terminal of each of the one or more power phase modules, the first housing and the corresponding second housing of each of the one or more power phase modules comprising a bus aperture through which the bus bar is disposed.

The apparatus may further include a neutral phase module that connects to a neutral line of the power system, the neutral phase module having: a third housing; an electrically conductive second splice block disposed in the third housing and configured to electrically connect to the neutral line; a third SPD terminal and a fourth SPD terminal disposed in the third housing and configured to electrically connect to one of the one or more SPD modules, the third SPD terminal being electrically connected to the second splice block; a neutral terminal electrically connected to the third SPD terminal, wherein the first bus bar is attachable between the grounding terminal and the corresponding bus terminal of each of the plurality of power phase modules; and, a ground terminal electrically isolated from the second splice block and electrically connected to the fourth SPD terminal. A conductive, rigid second bus bar may be attachable to the grounding terminal of the grounding module and to the ground terminal of the neutral phase module. The first housing, the corresponding second housings of the plurality of power phase modules, and the third housing, may have planar front and rear surfaces and cooperating front profiles.

In another aspect, the present disclosure provides a distribution, block for a high-current power system, the distribution block including: an electrically conductive grounding clamp configured to electrically and mechanically connect to a DIN rail and to retain the distribution block in place with respect to the DIN rail; an electrically conductive bus terminal; an electrically conductive, rigid bus bar that electrically connects to the grounding clamp and to the bus terminal; a conductive splice block configured to electrically connect, at an input side of the distribution block, to a first power cable that carries a line current from a power supply, and to electrically connect, at an output side of the distribution block, to a second power cable that carries the line current to a powered device; and a first SPD terminal and a second SPD terminal configured to together receive and electrically connect to an SPD module, such connection forming a surge protection circuit within the distribution block, the first SPD terminal electrically connecting to the bus terminal and the second SPD terminal electrically connecting to the splice block.

The first SPD terminal and the bus terminal may be electrically isolated from the splice block. The bus bar may connect the surge protection circuit to ground, cooperating with the grounding clamp to retain the distribution block in place with respect to the DIN rail; the bus bar may be removable. The splice block is machined from a block of copper or may be formed from a sheet of conductive material. The second SPD terminal may be integral with the splice block and formed from the same sheet of conductive material.

The distribution block may further include a grounding terminal electrically connected to the grounding clamp, wherein to electrically connect to the grounding clamp and the bus terminal, the bus bar mechanically attaches to the bus terminal and to the grounding terminal. The grounding terminal may be integral with the grounding clamp. The bus bar may removably attach to the bus terminal and to the grounding terminal. A bus bar cover may be disposed over the bus bar and the bus terminal and must be removed to remove the bus bar from the bus terminal. The splice block, the bus terminal, and the first and second SPD terminals may be disposed in a phase module housing that retains the SPD module, the first phase module housing comprising a plurality of apertures together allowing the first power cable, the second power cable, the bus bar, and one or more connectors of the SPD module to extend into the first phase module housing.

In another aspect, the present disclosure provides an apparatus for distributing power and providing surge protection in a high-current power system, the apparatus including: a ground module having a first housing, an electrically conductive grounding clamp disposed in the first housing and configured to electrically and mechanically connect to a DIN rail, and a grounding terminal electrically connected to the grounding clamp. The apparatus further includes one or more power phase modules each having: a second housing configured to receive all or a portion of a corresponding SPD module of one or more SPD modules; an electrically conductive first splice block disposed in the second housing and configured to electrically connect to an input side conductor that carries current from a power supply, and to an output side conductor that carries current to a powered device; a first SPD terminal disposed in the second housing, electrically connected to the first splice block, and configured to electrically connect to the SPD module; a bus terminal electrically isolated from the first splice block and configured to electrically connect to the grounding terminal; and, a second SPD terminal disposed in the housing, electrically connected to the bus terminal, and configured to electrically connect to the SPD module.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
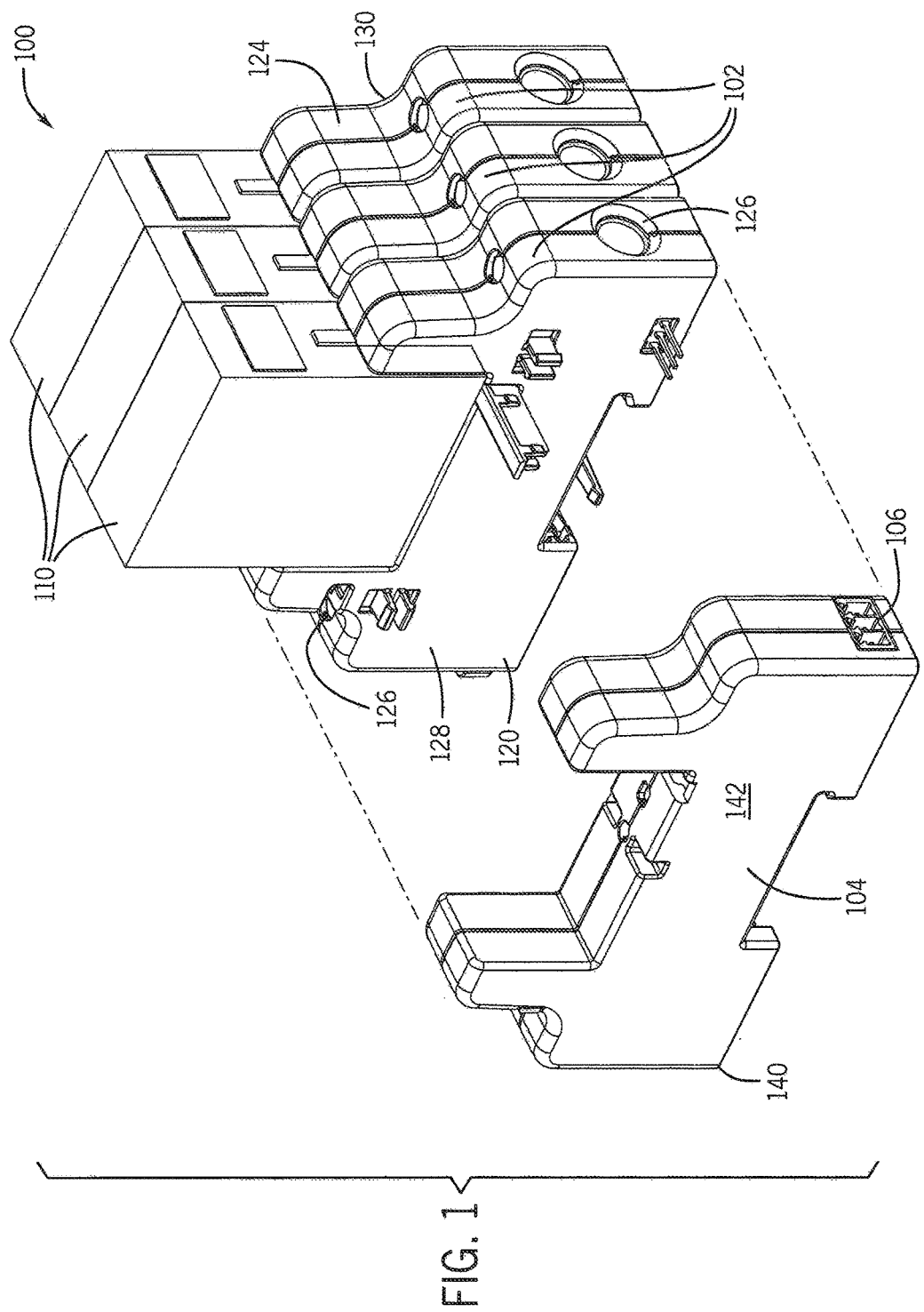
FIG. 1 is a top-front-left perspective view of a distribution block with integrated surge protection implemented to distribute three-phase power, according to one embodiment of the disclosure.

Before any embodiments of the invention are explained in detail it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a modular power distribution block with integrated surge protection, referred to herein as a surge-distribution block 100. It will be understood that while the present modular system is shown implementing a distribution block for a three-phase power system, the modules of the system may be configured to perform other power load management tasks, and to operate in systems that are not three-phase and that provide any typical or atypical voltage of alternating or direct current, provide a clamping voltage can be identified. Furthermore, the surge-distribution block 100 may be composed of any number of phase modules 102 which operate with any suitable surge protective device (SPD) module 110 now known or later developed, and may further be composed of any number of ground modules 104. The illustrated surge-distribution block 100 and other embodiments thereof can manage distribution of higher currents typical to industrial environments. Non-limiting, exemplary SPD modules 110 with which the surge-distribution block 100 may be compatible include the ERICO CRITEC multi-phase surge diverters and other shunt-style plug-in SPD modules.

As stated, the surge-distribution block 100 may include one or more phase modules 102. A phase module 102 serves to mount all or part of an SPD module 110 and to electrically connect the mounted SPD module 110 to the power line. In known systems, an SPD module 110 is needed for each conductor in the power line that carries current (i.e., a conductor for each phase of the power system, and an additional conductor for a neutral line that is separate from ground, such as in TN-S systems). Thus, the surge-distribution block 100 may have the same number of phase modules 102 as there are current-carrying conductors in the power line; the illustrated surge-distribution block 100 for a three-phase TN-C system has three phase modules 102, a corresponding surge-distribution block for a three-phase TN-S system has four phase modules 102, and a corresponding surge-distribution block for a single-phase electric power system may have as few as one phase module 102. In polyphase embodiments, the corresponding plurality of phase modules 102 may horizontally abut each other, and may appear as an integrated unit together forming a single cavity in which a multiphase SPD module 110 can be mounted.

In particular, a phase module 102 can have a housing 120 that receives the SPD module 110 and also encloses the other components of the phase module 102. The housing 120 can be a non-conductive, corrosion resistant rigid polymer or other suitable material. The housing 120 can include arms 122, 124 extending upward to form a brace that retains all or a portion of the SPD module 110 as shown. Line connection apertures 126 may be disposed through the housing 120 to allow connection of the power cables to the surge-distribution block 100. Additional apertures can facilitate other electrical connections as described below. The front surface 128 and rear surface 130 of the housing 120 can be substantially planar, allowing flush contact between adjacent phase modules 102.

The phase modules 102 may be electrically connected to each other and to one or more ground modules 104 of the surge-distribution block 100. The ground module 104 makes secure electrical and mechanical contact with a DIN rail to provide an electrical ground for the power line via the surge-distribution block 100. The ground module 104 can include a housing 140 that encloses the other components of the ground module 104. The housing 140 can be a non-conductive, corrosion resistant rigid polymer or other suitable material, and can include apertures for facilitating electrical contact with the phase modules 102 and electrical and mechanical contact with the DIN rail as described further below. The housing 140 can also have a planar front surface 142 and/or rear surface that facilitate flush, contact with one of the phase modules 102, so that the surge-distribution block 100 looks and functions like an integrated component. In some embodiments, one or more signal connector blocks, such as an alarm contact block 106, can be mechanically connected to the ground module 104 and/or to one or more of the phase modules 102 as needed to detect operational abnormalities and/or report them to a remote monitor. In some embodiments, the alarm contact block 106 may serve as an interface for the end user's remote monitoring signals. The surge-distribution block 100 may have an isolated circuit to pass the input signal (from end-user) through a switch and back out the same contact block in either a normally open or normally closed terminal depending on the state(s) of the SPD module(s) 110.

Figure 2A:
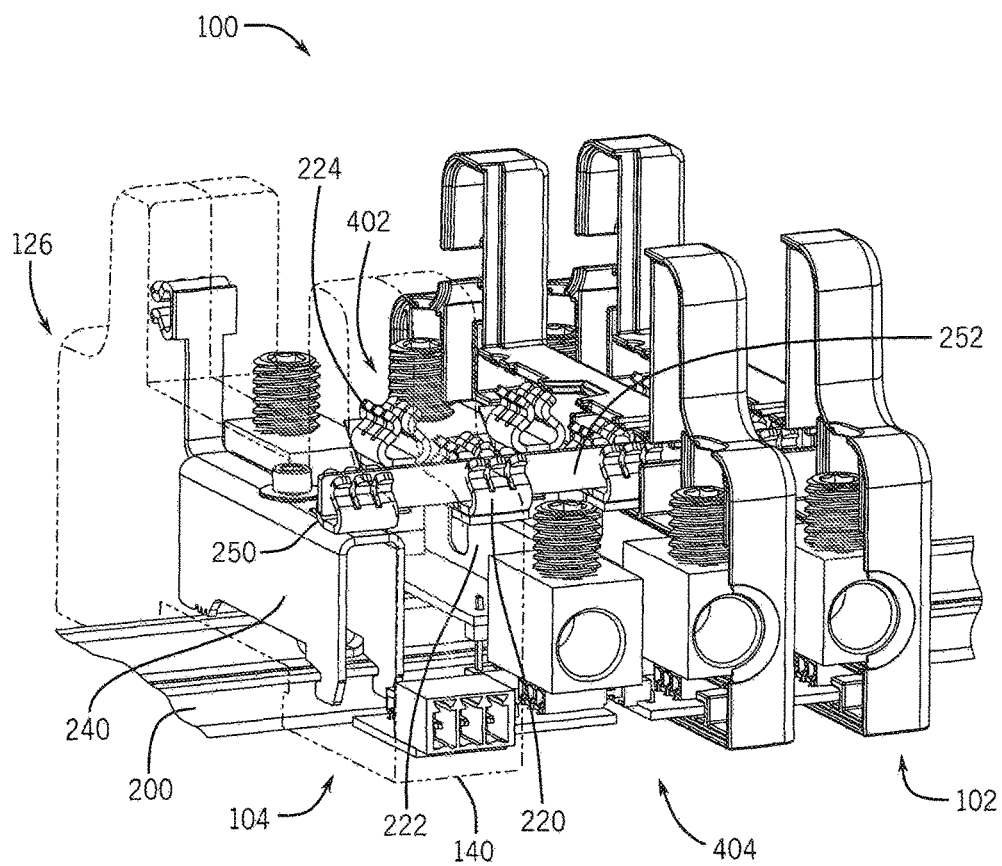
FIG. 2A is a front-left perspective partial cutaway view of the distribution block of FIG. 1 clamped to a DIN rail, shown with surge protective device (SPD) modules removed, the housings of the ground module and one of the single phase modules removed, and the housings of the other two phase modules shown in cross-section, to illustrate internal components of the ground module and the single phase module.
Figure 2B:
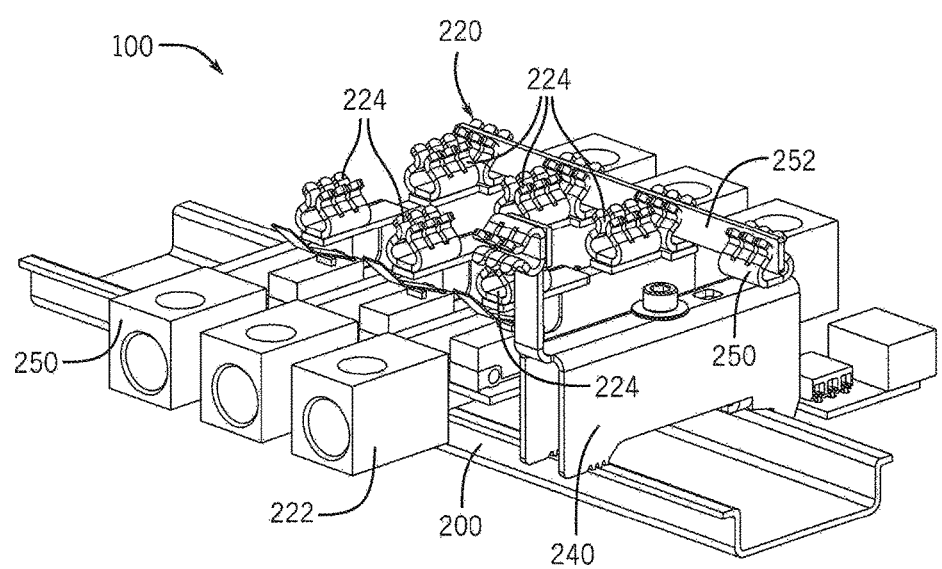
FIG. 2B is a front-right perspective view of the distribution block of FIG. 2A with all module housings removed to show internal components of the modules.

In FIGS. 2A-B, the surge-distribution block 100 is attached to a DIN rail 200 by way of a grounding clamp 240 contained in the housing 140 of the ground module 104. The grounding clamp 240 attached to the DIN rail 200 in this manner provides a ground for the surge-distribution block 100 and the power lines electrically connected thereto, and also secures the surge-distribution block 100 in place on the DIN rail 200. The ground module 104 may further include a grounding terminal 250 that is in electrical contact with the grounding clamp 240 and may further be integral with or mounted on the grounding clamp 240. See FIG. 3. The grounding terminal 250 may be a suitable metal or other conductive material that is sufficiently resilient to receive and tightly retain a bus bar 252. The bus bar 252 is bar of rigid metal (or other conductive material), preferably copper or another highly conductive metal, that fits into the grounding terminal 250 and is retained there by friction fit, maintaining, a good electrical connection.

The bus bar 252 exits the housing 140 and extends through the phase modules 102, being retained in each phase module 102 by a bus terminal 220 described further below. The bus terminal 220 of each phase module 102 is also conductive, and when clipped to the bus bar 252 creates the grounding connection to the ground module 104 via the bus bar 252. The bus bar 252 may be a simple rectangular piece of conductive metal in some embodiments, and in other embodiments may yet be planar but has a specially-configured perimeter that ensures good contact with the grounding terminal 250 and all of the bus terminals 220. In still other embodiments, the bus bar 252 may be bent or may have surface features that contribute to establishing and maintaining good electrical contact with the terminals 220, 250. The bus terminal 220 may be disposed parallel or at an angle to the grounding terminal 250, and may be axially aligned with or offset from the grounding terminal 250. In the illustrated surge-distribution block 100, the bus terminal 220 is parallel to the ground terminal 250 and is aligned front-to-back with the ground terminal 250, but is disposed slightly higher (i.e., further from the DIN rail 200) than the ground terminal 250 because the bus terminal 220 is mounted above the splice block 222 described below. The illustrated bus bar 252 is thus L-shaped, having a tab that is retained in the grounding terminal 250 while the bus terminals 220 retain a longer body portion of the bus bar 252 as shown. The bus terminal 220, like the grounding terminal 250, can be made of a rigid, highly conductive metal (i.e. copper) or other material with suitable resilience for holding the bus bar 252 by friction fit. Alternatively, any of the terminals 220, 250 may attach to the bus bar 252 with a fastener or other attachment mechanism, or may be welded to the bus bar 252 if a permanent installation is suitable.

The phase module 102 can further include one or more SPD terminals 224 for receiving and retaining an SPD module 110. The SPD terminals 224, like the bus terminal 220, can be made of a rigid, highly conductive metal (i.e. copper) or other material with suitable resilience for holding an SPD module 110 by friction fit and establishing a sound electrical connection to the SPD module 110. The SPD terminals 224 electrically, and may also physically, connect to ground via the bus terminal 220 and to power via a splice block 222 of the phase module 102, as further described below with respect to FIGS. 4A-B. The splice block 222 is a conductive metal (e.g., copper) component that connects to one or more power lines from the power source at an input side 402 of the phase module 102, and connects to power lines that run to the powered device at an output side 404 of the phase module 102. For example, power lines may be disposed through the line connection apertures 126 of each phase module 102 and electrically connected to the splice block 222. In some embodiments, one or more of the terminals 220, 224 may be integral with the splice block 222 or mounted thereon via permanent (e.g., welds) or non-permanent (e.g., screws or other fasteners) attachment. In operation, the splice block 222 will carry the power line current from the incoming power lines (i.e., attached to the surge-distribution block 100 on the input side 402) through to the outgoing power lines (i.e., attached to the surge-distribution block 100 on the output side 404); the SPD terminals 224 will receive the power line current from the splice block 222 and communicate the power line current to the SPD module 110, and so should have a good electrical connection.

Figure 3:
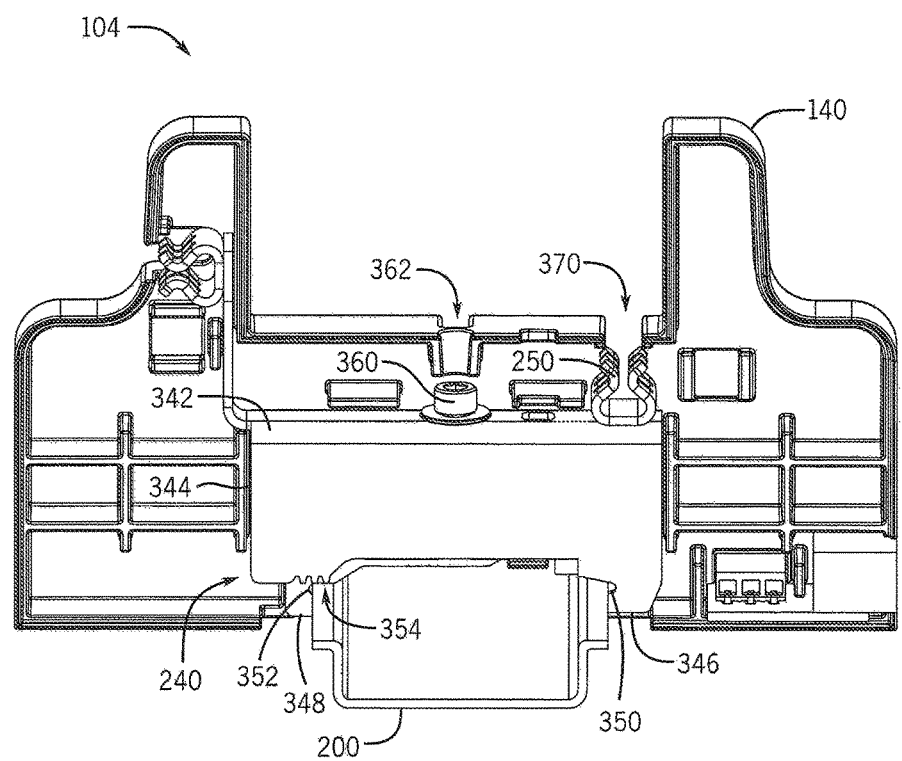
FIG. 3 is a top-front perspective view of a ground module of the distribution block of FIG. 1, shown with the housing in cross-section and with a ground clamp attached to the DIN rail as in FIG. 2A.

FIG. 3 illustrates the components of the ground module 104. A bar 342, which may be any suitable metal or another rigid conductive material, has a body 344, a first leg 346 integral with the body 344, and a second leg 348 integral with the body 344. The legs 346, 348 extend from the body 344 downward (i.e., toward the DIN rail 200) and contact the DIN rail 200. A first detent 350, which may be a groove at or near the top of the first leg 346, receives and retains one end of the DIN rail 200 in both electrical and mechanical contact. The DIN rail 200 may be retained in the detent 350 by friction fit or by way of a fastener (not shown). A second detent 352 forms a groove at or near the top of the second leg 348. The opposite end of the DIN rail 200 is retained in the second detent 352 in both mechanical and electrical contact with the bar 342. A set screw 360 may be rotated to tighten the clamping force against the DIN rail 200, as described further below with respect to FIGS. 8A-B. A set screw aperture 362 may be disposed through the housing 140 to provide access to the set screw 360. One or more teeth 354 may be formed into the surface of the bar 342, such as on the bottom surface of the body 344, to provide additional electrical and/or mechanical contact of the bar 342 with the DIN rail 200. The grounding terminal 250 may be attached to or integral with the bar 342, and may align with a bus bar aperture 370 disposed through the housing 140; the bus bar may be inserted through the bus bar aperture 370 to attach to the grounding terminal 250 as illustrated in FIGS. 2A-B.

Figure 4A:
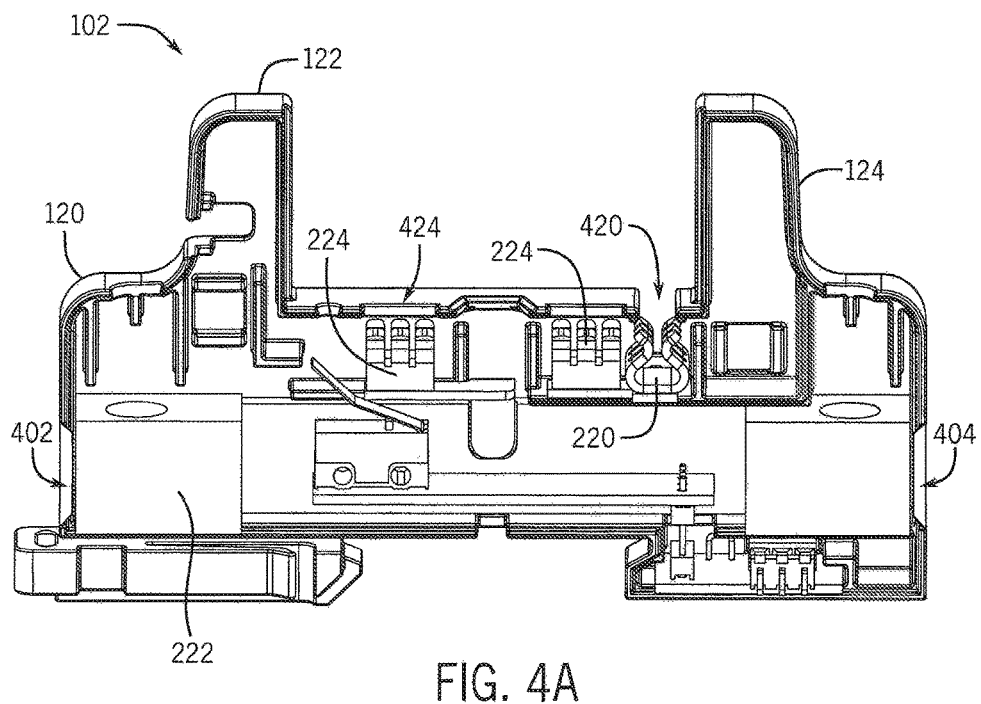
FIG. 4A is a top-front perspective view of a phase module of the distribution block of FIG. 1, shown with the housing in cross-section.
Figure 4B:
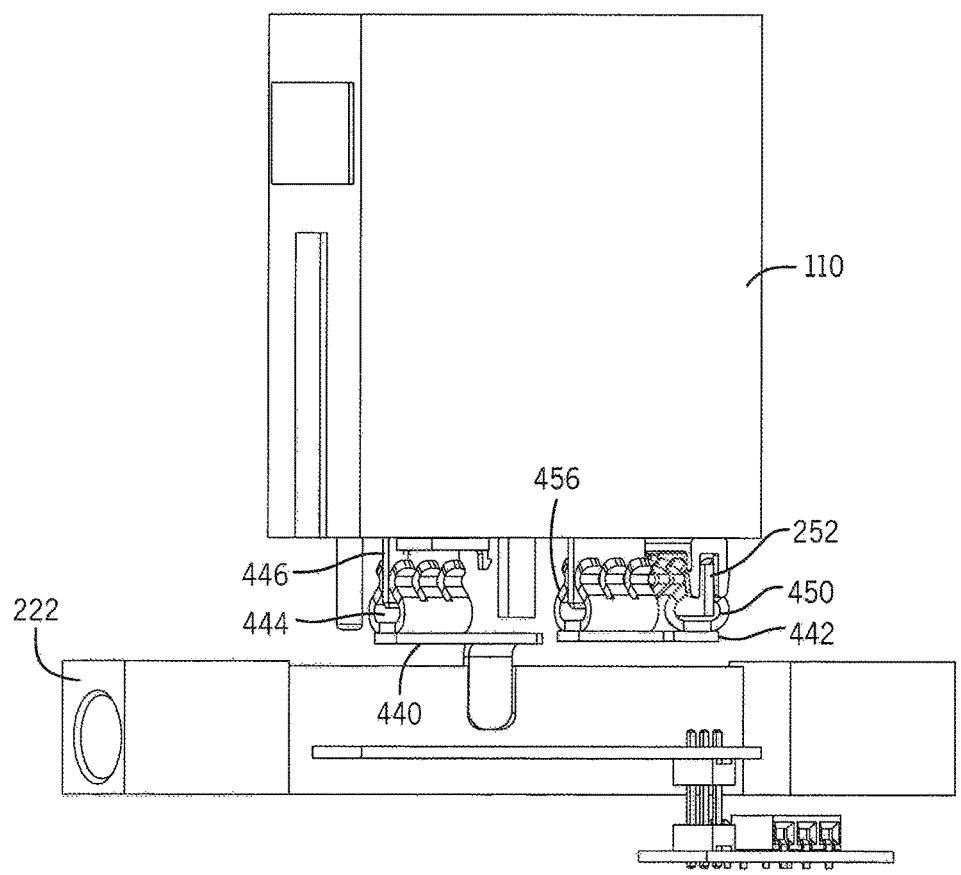
FIG. 4B is a front-right perspective view of the phase module of FIG. 4A with the housing removed and a SPD module attached.
Figure 4C:
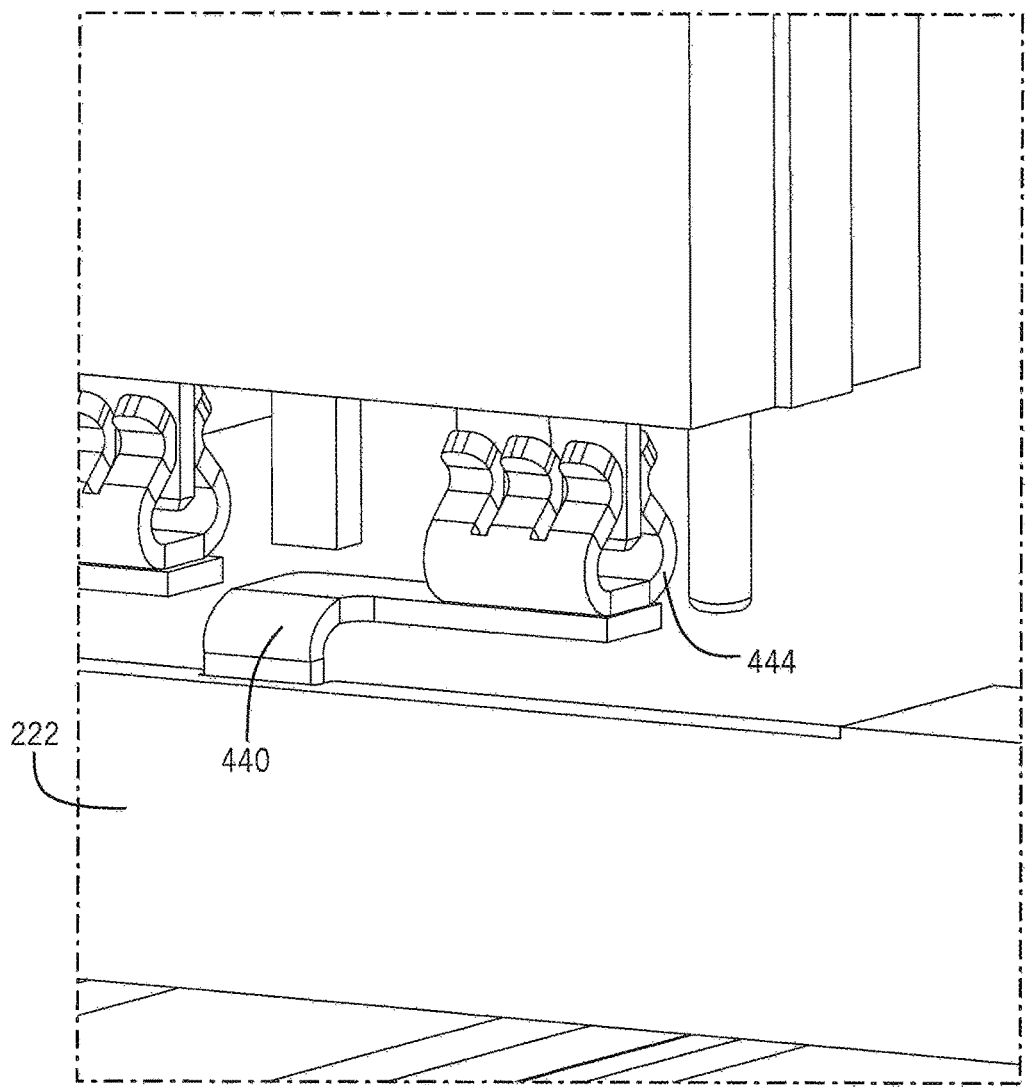
FIG. 4C is a rear-right perspective close-up view of the SPD module and phase module connection of FIG. 4B.

FIG. 4A illustrates the components of a phase module 102 via cutaway at the vertical midsection of the housing 120. The splice block 222 extends from one or more apertures through the housing 120 at the input side 402 to corresponding apertures at the output side 404. One of the SPD terminals 224 may electrically connect to the bus terminal 220, grounding any SPD module inserted into the phase module 102. The other SPD terminal 224 may electrically connect to the splice block 222. In some embodiments, apertures in the housing 120 of the phase module 102 facilitate installation of the bus bar and the SPD module as described above. For example, the bus terminal 220 can be accessible through a bus aperture 420 and the SPD terminals 224 can be accessible through SPD apertures 424. FIGS. 4B-C illustrate an example of an inserted SPD module 110, with the phase module housing removed for clarity. A terminal connector 440, which may be a stamped conductive metal connector, may attach to the splice block 222 at one end, and may attach to a first of the SPD terminals 444 at the other end, creating the electrical connection between the splice block 222 and the SPD terminal 444, The terminal connector 440 may further serve as a mount for the SPD terminal 444, retaining the SPD terminal 444 in a vertical orientation to receive a connecting tab 446 of the SPD module 110. The other SPD terminal 456 may be similarly mounted and electrically connected to the bus terminal 450 by another terminal connector 442. The bus terminal 450 (and bus bar 252), SPD terminal 456, and terminal connector 442 may he electrically isolated from the splice block 222, such as by a portion of the housing of the phase module.

In this manner, a block of three phase modules connect each, phase of the power lines from a three-phase power supply to the powered device. A surge in the power line current can be routed through the SPD modules that are mounted on the phase module housings and connected to the SPD terminals. All electrical connections are grounded and the surge-distribution block is securely fastened in place— the clamp of the ground module securely attaches to the DIN rail, and the phase modules securely attach to each other and to the ground module via retention of the bus bar by a bus terminal in each phase module and a ground terminal in the ground module.

Figure 5:
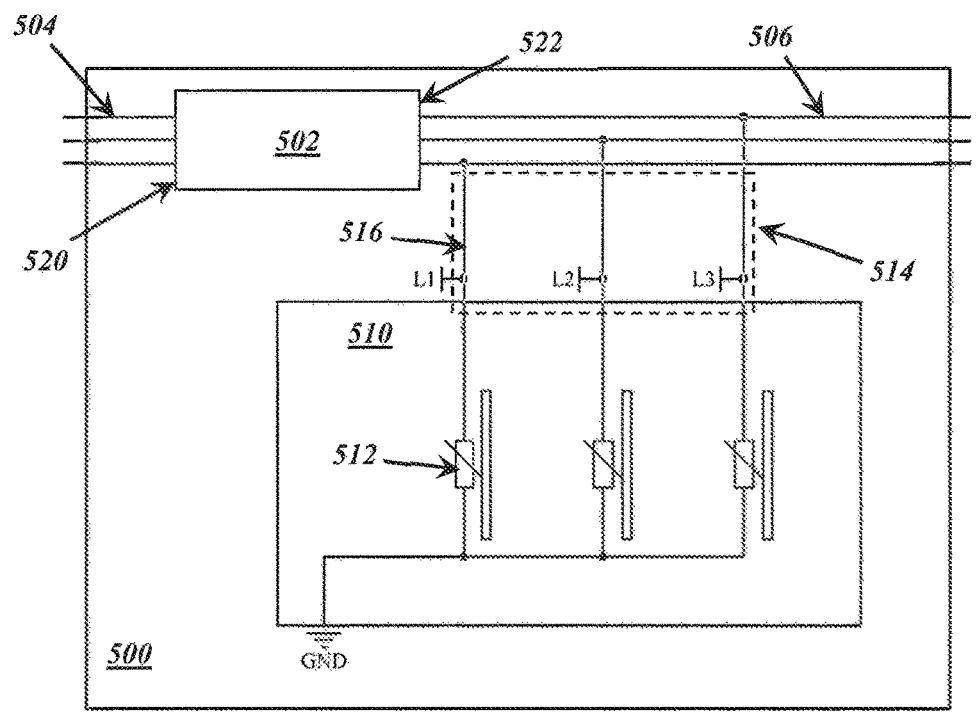
FIG. 5 is a circuit diagram of a prior art shunt style SPD for three-phase power.

FIG. 5 schematically illustrates the electrical connections of existing solutions for shunt-style SPDs 510 in a TN-C power system 500 that uses high current that cannot be managed with existing surge filters. A distribution or power block 502 has conductor(s) 504 of a power line from the power supply (not shown) connected to an input side 520 of the power block 502, and conductor(s) 506 of a power line for the powered device/load (not shown) connected to an output side 522 of the power block 502. The SPD 510 has a conductive component 512, such as a metal-oxide varistor, gas discharge tube, silicon diode, etc., electrically connected to each conductor 506 downline from the output side 522 of the power block 502. This connection is made with an SPD wire 514 having conductors 516 each connected to one of the conductors 506. The SPD wire 514 connects the SPD 510 in parallel between the output side 522 of the power block 502 and the powered device/load. The length of the SPD wire 514 impairs the operation of the SPD 510 due to the additional distance that the current must travel after leaving the power block 502 to reach the SPD 510.

Figure 6:
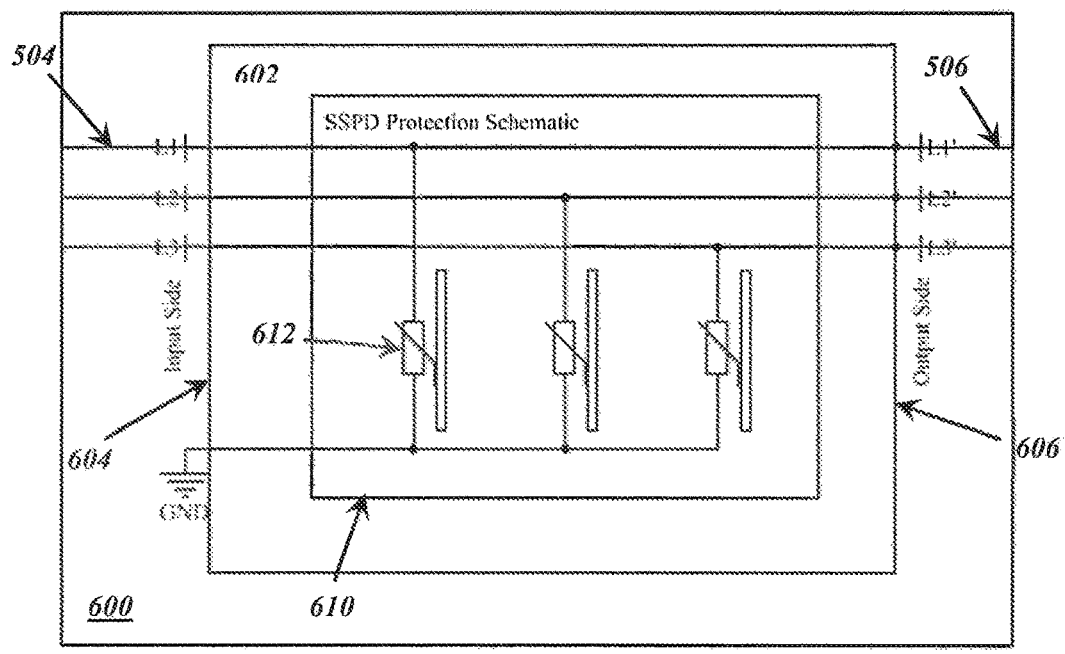
FIG. 6 is a circuit diagram of an exemplary distribution block with integrated surge protection implemented to distribute three-phase power in a combined earth and neutral (TN-C) system, according to one embodiment of the disclosure.

The SPD wire 514 and its attendant problems are eliminated by the presently disclosed apparatuses. Referring to FIG. 6, a TN-C power system 600 for powering the same load with the same power supply as in the power system 500 of FIG. 5 uses an integrated surge-distribution block 602 having the components and configuration as described above with respect to the surge-distribution block 100 of FIGS. 1-4C. The surge-distribution block 602 replaces the power block 502 and the SPD 510 of the power system 500 of FIG. 5. The conductors 504 from the power supply (not shown) connect to an input side 604 of the surge-distribution block 602, and the conductors 506 for the powered device/load (not shown) connect to an output side 606 of the surge-distribution block 602. A surge protection circuit 610 is integrated in the surge-distribution block 602 and is formed by installing one or more SPD modules into the phase module(s) of the surge-distribution 602 as described above. The conductive components 612 (e.g., varistors of the installed. SPD module(s)) in the surge protection circuit 610 are electrically connected to the conductors 504, 506 via the SPD terminals and the splice blocks of corresponding phase modules in the surge-distribution block 602. The bus bar of the surge-distribution block 602 passes the current through the surge-distribution block 602; the surge-distribution block 602 is thus connected in series with the power supply and the powered device/load, but the surge protection circuit 610 still operates as a shunt-style SPD, redirecting excess current to ground via the ground module(s) of the surge-distribution block 602.

Figure 7:
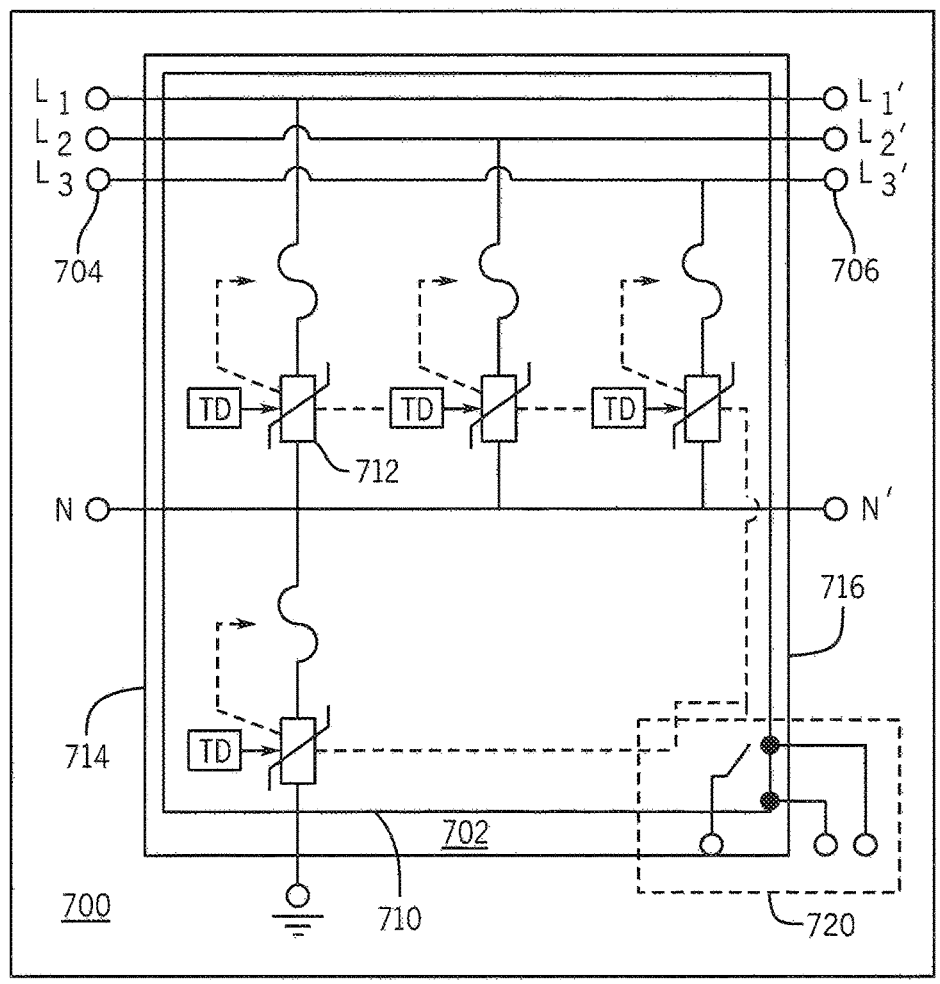
FIG. 7 is a circuit diagram of another exemplary distribution block with integrated surge protection implemented to distribute three-phase power in a separate earth and neutral (TN-S) system, according to one embodiment of the disclosure.

FIG. 7 illustrates another implementation of a surge-protection block 702, using the phase and ground modules described above, in a TN-S power system 700. The conductors 704 from the power supply (not shown) include three phase conductors and one neutral conductor, and connect to the input side 714 of the surge-protection block 702. Similarly, three phase conductors and a neutral conductor comprise the conductors 706 that connect to the output side 716 of the surge-protection block 702 and provide power to the powered device/load (not shown). A surge protection circuit 710 is integrated within the surge-distribution block 702 and includes a conductive component 712 of the installed SPD module(s) for each of the conductors 704. The dotted lines and switching circuit 720 represent the isolated remote alarm contact circuitry discussed above. The switch is mechanically triggered from a thermal disconnect incorporated with the SPD modules. During an end-of-life scenario the thermal disconnect separates the SPD from the circuit. In addition, it releases a pin which changes the state of the switch. See FIG. 9. This mechanical change is what reroutes the end users signal from the normally ON (status "ok") to the normally OFF (status "end-of-life") state. The surge-distribution block 702 and its surge protection circuit 710 are connected serially with the power supply and powered device/load as described above.

Figure 8:
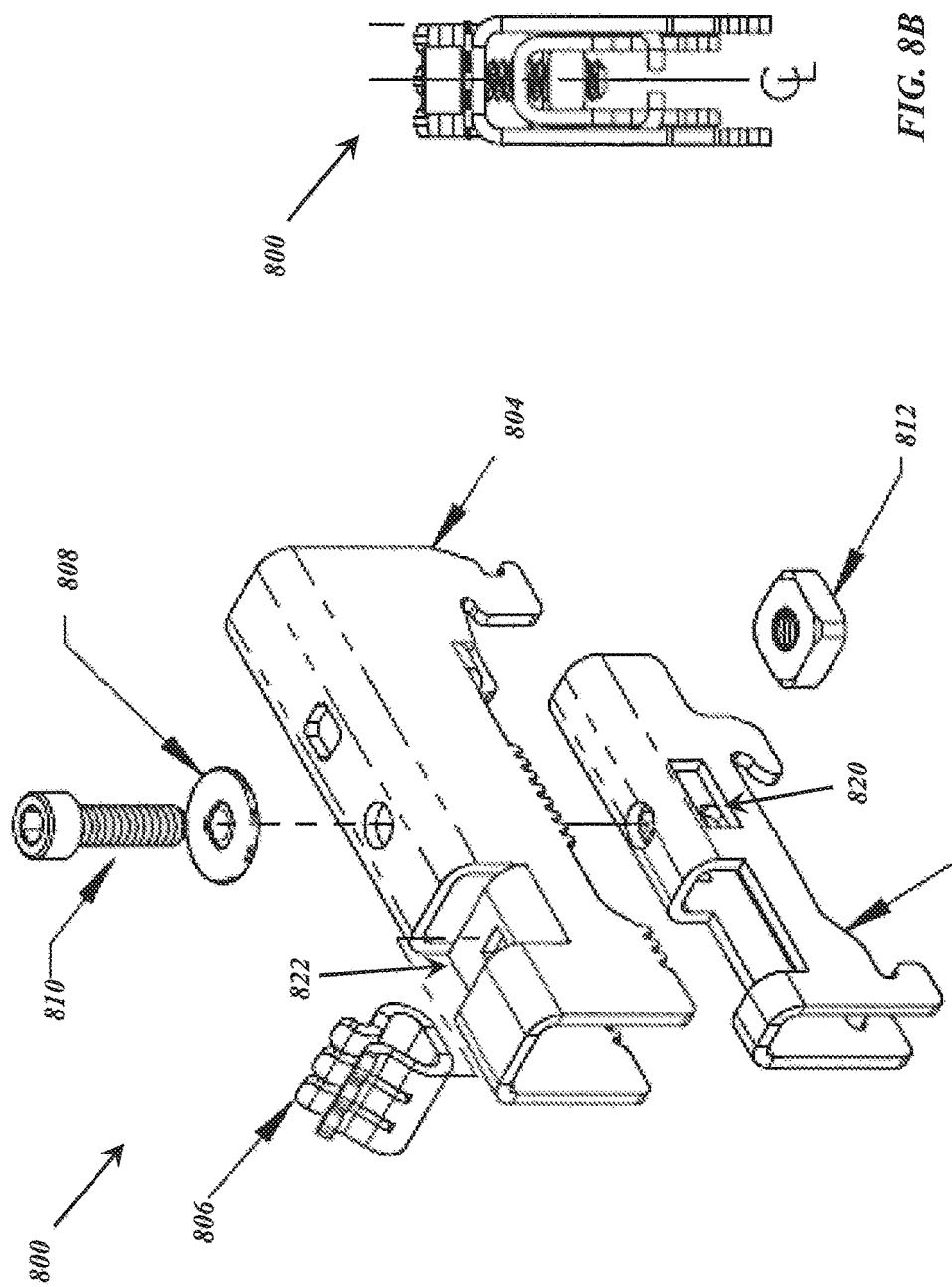
FIG. 8A is an exploded top perspective view of a ground clamp in accordance with the disclosure.
FIG. 8B is a side view of the ground clamp of FIG. 8A.

FIG. 8 illustrates an exemplary ground clamp 800 as described above with respect to the grounding clamp 240 of the previous Figures. A nut 812 is installed in a slot 820 formed in the middle of the bottom part 802 of the ground clamp 800. The top part 804 of the ground clamp 800 is placed over the bottom part 802 of the ground clamp 800. The set screw 810, with washer 808 installed, is placed through both parts 802, 804 of the ground clamp. When the screw 810 is loose in the nut 812, the assembly can pivot out and around the DIN rail (not shown). The set screw 810 is then rotated to tighten the assembly. This pulls the bottom part 802 of the ground clamp 800 further into the top part 804 of the ground clamp 800, clamping onto the DIN in the process. The grounding terminal 806 that receives the bus bar, as described above, may be inset within a cavity 822 formed in the top part 804.

Figure 9:
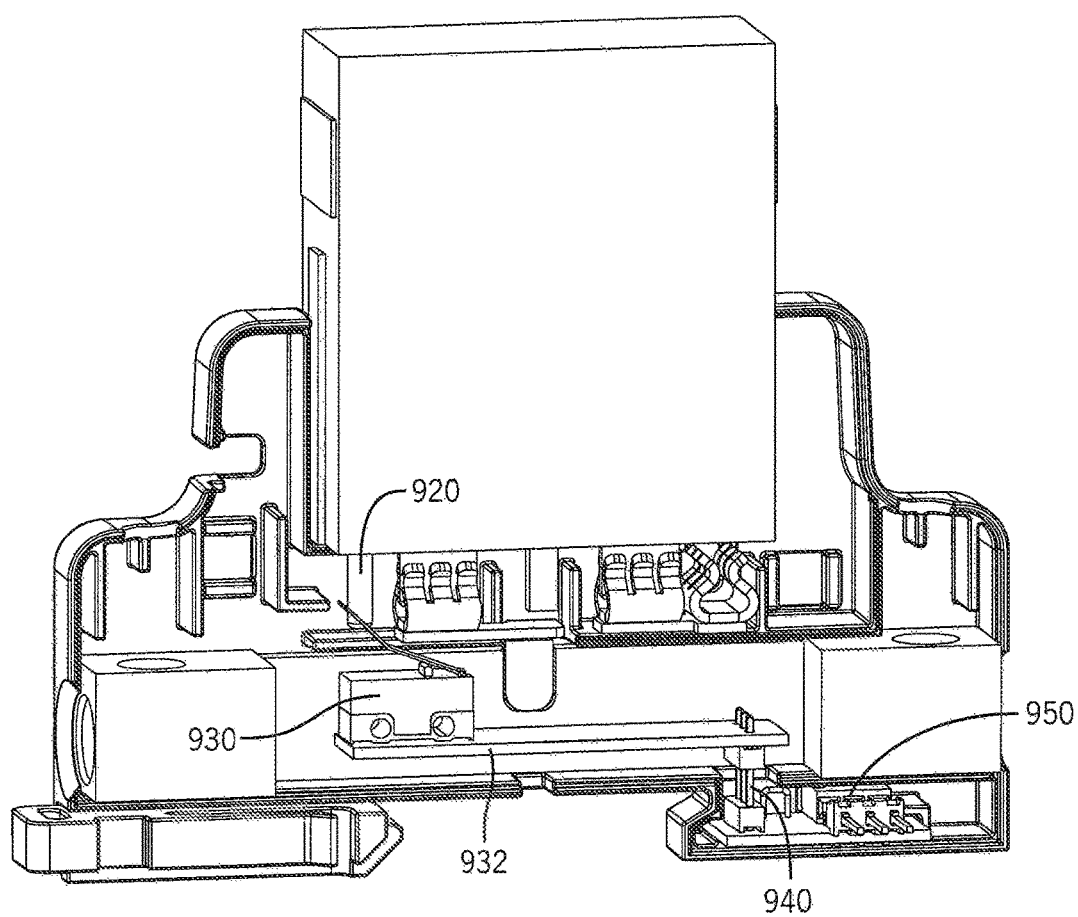
FIG. 9 is a top-front perspective view of a SPD module attached to a phase module in accordance with the disclosure, shown with the phase module housing in cross-section.

Referring to FIG. 9, the phase module 102 may further include mechanical and electronic components that enable connection of the phase module 102 to a monitoring system. In various embodiments, the phase module 102 can transmit data to the monitoring system, which can then process the data and activate corresponding alarms, messages, reporting tasks, data recordation tasks, and the like. In one embodiment, the phase module 102 may include a switching device 930 positioned to interact with a pin 920 of the SPD module 110. The switching device 930 may include a mechanical or electrical switch, circuit components for detecting the position of the switch, and circuit components for transmitting a signal describing the state of the switch. The switching device 930 may, for example, be connected by wires 940 to an interface, such as a pin connector 950, that extends out of the housing 120 and receives a corresponding connector for a device in the monitoring system. Alternatively, the interface may communicate with the monitoring system wirelessly.

Figure 10:
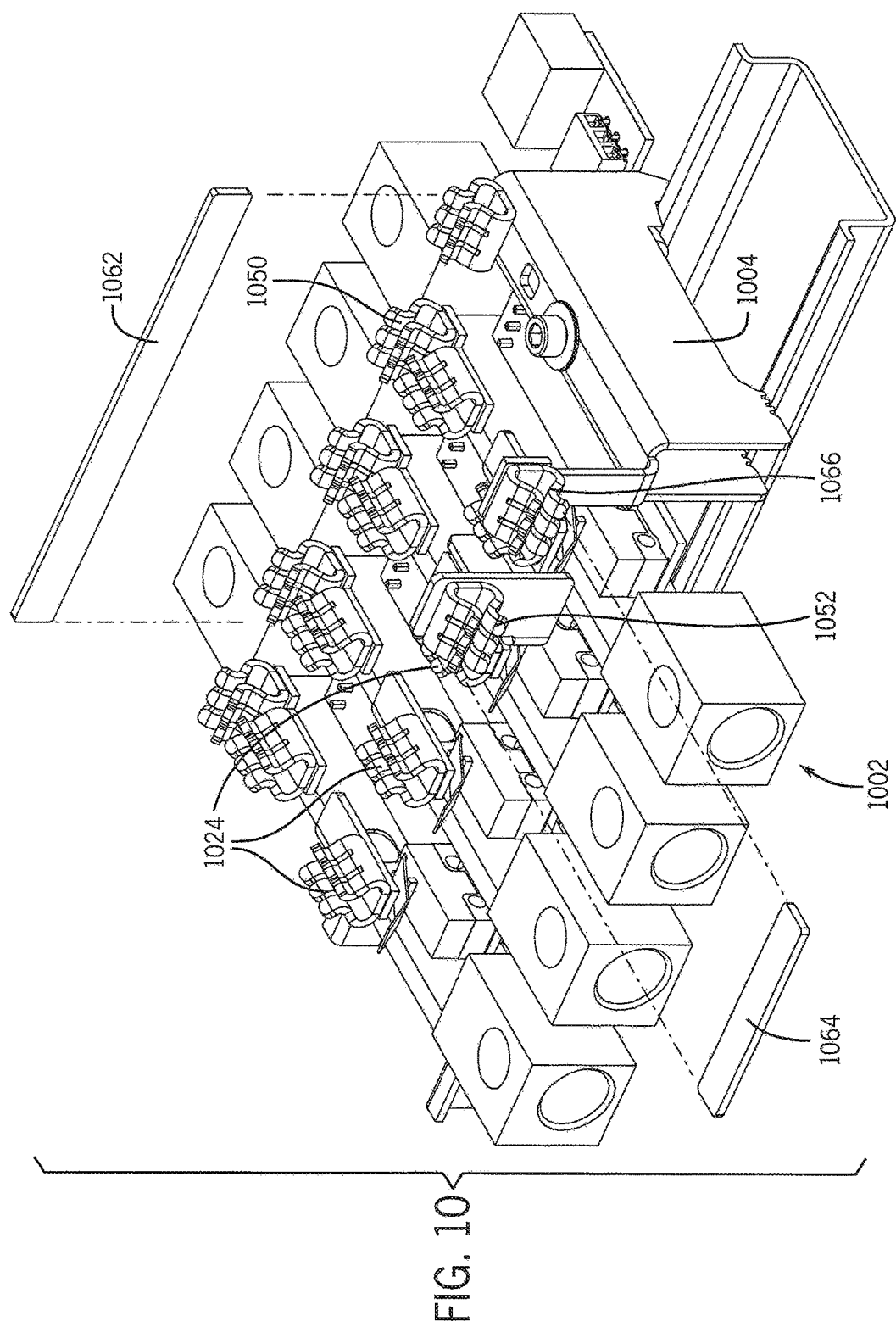
FIG. 10 is a front-right perspective view of another embodiment of a distribution block having a TN-S configuration, with all module housings removed to show internal components of the modules.
Figure 11:
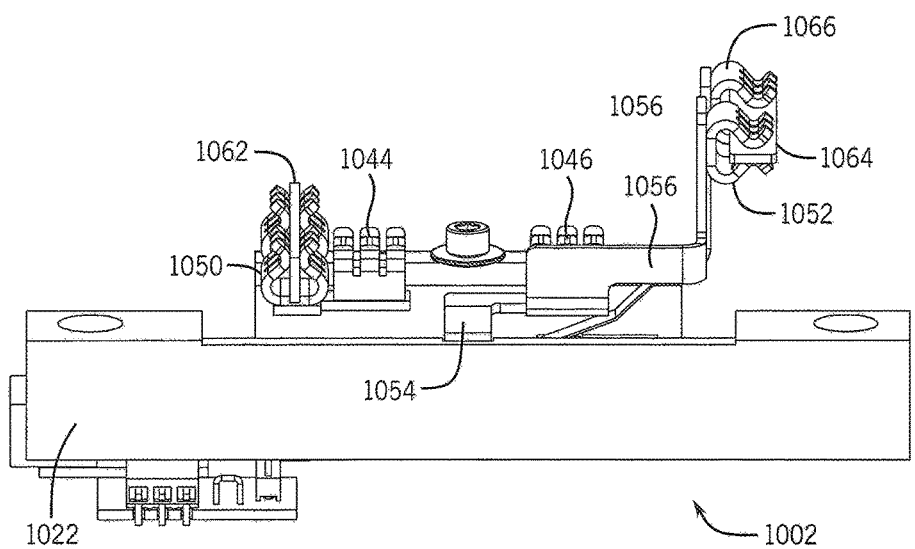
FIG. 11 is a top-front perspective view of a neutral phase module of the distribution block of FIG. 10, shown with the housing removed and with a connection to a ground terminal of a ground module in accordance with the present disclosure.

As explained above, the SPD module 110 can be configured with internal sensing means, such as a thermal switch, counter, and other circuit components that monitor the number of times the SPD module 110 has activated, the number of days the SPD module 110 has been installed, and/or other parameters relating to the expiration or end of useful life of the SPD module 110. During the SPD module's 110 useful life, the pin 920 is maintained in a position that, with the SPD module 110 fully inserted in the phase module 102, contacts the switch of the switching device 930 so that the switching device 930 produces a signal indicating normal function of the SPD module 110. For example, the pin 920 can depress the switch to place the switching device 930 in an "ON" state. When the SPD module 110 internal systems determine end-of-life has been reached, the pin 920 is retracted out of contact with the switch (e.g., changing the switching device 930 state to "OFF"), causing the switching device 930 to produce a warning signal. In other embodiments, the switching device 930 may produce a signal only when the pin 920 is closing the switch, and may stop producing the signal when the pin 920 is retracted; the monitoring system may be programmed to identify the loss of signal as an indicator that the SPD module 110 has failed.

Where the embodiments of FIGS. 2A-B pertain to TN-C configurations, FIGS. 10 and 11 illustrate a TN-S configuration of a surge-distribution block 1000, which has four phase modules and a ground module each shown with the housings hidden to illustrate the internal connections. The three power phase modules 1024 are interconnected as described above. A fourth phase module is a neutral phase module 1002. The neutral phase module 1002 may have a neutral terminal 1050 that connects via neutral bus bar 1062 to the other phase modules, and is electrically connected to one of the SPD terminals 1044 as described above. Further, a first terminal connector 1054 may electrically connect the SPD terminal 1044 and the neutral terminal 1050 to a neutral splice block 1022. The neutral phase module 1002 may further include a ground terminal 1052 that is electrically connected to the other SPD terminal 1046. The ground terminal 1052 and SPD terminal 1046 may be mounted on a second terminal connector 1056 and may be electrically isolated from the neutral splice block 1022 as described above. The ground terminal 1052 may electrically connect by ground bus bar 1064 to a grounding terminal 1066 of the grounding module 1004 as described above.

Figure 12:
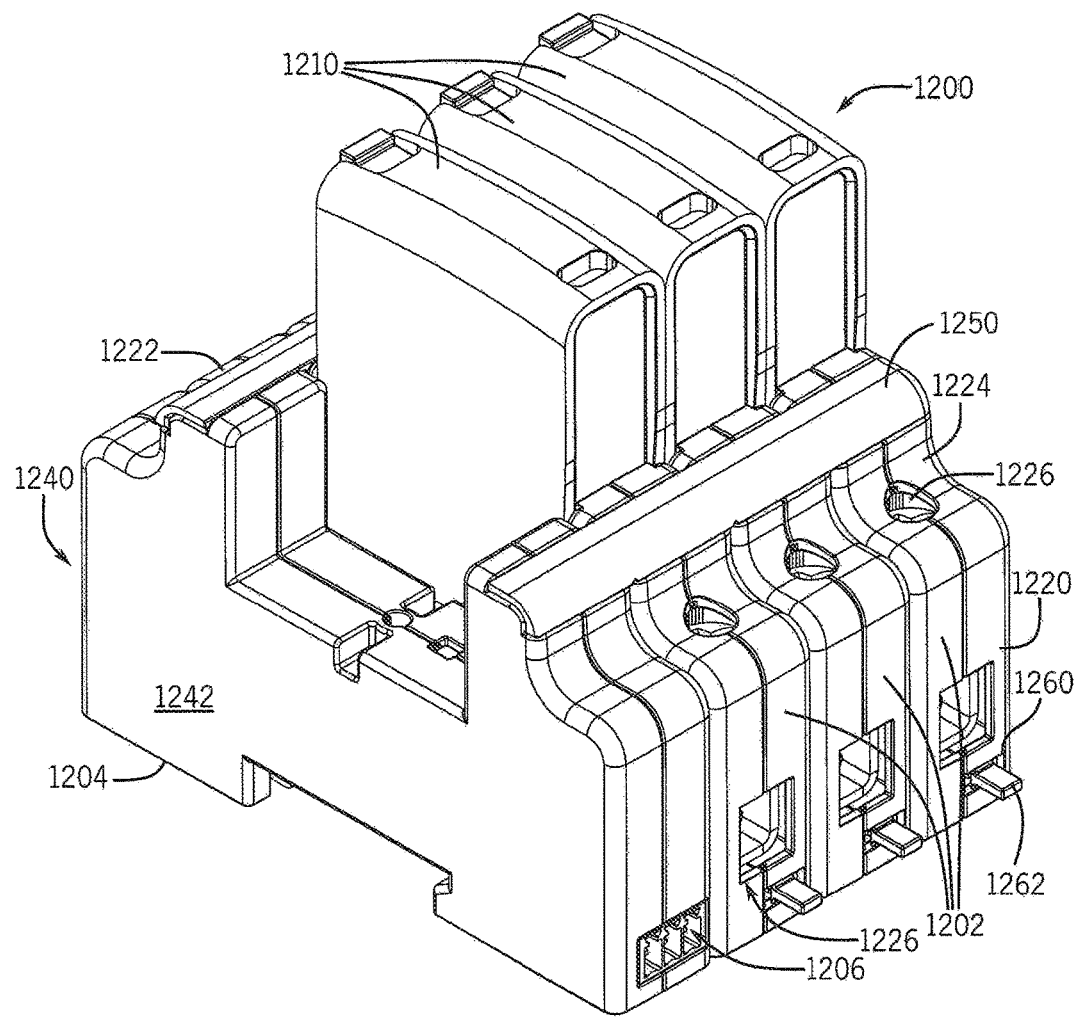
FIG. 12 is a top-front-left perspective view of a distribution block with integrated surge protection implemented to distribute three-phase power, according to another embodiment of the disclosure.

FIG. 12 illustrates another embodiment of a surge-distribution block 1200 in accordance with the present disclosure. It will be understood that while the present modular system is shown implementing a distribution block for a three-phase power system, the modules of the system may be configured to perform other power load management tasks, and to operate in systems that are not three-phase and that provide any typical or atypical voltage of alternating or direct current, provided a clamping voltage can be identified. Furthermore, the surge-distribution block 1200 may be composed of any number of phase modules 1202 which operate with any suitable SPD module 1210 now known or later developed. Non-limiting exemplary SPD modules 1210 with which the surge-distribution block 1200 may be compatible include the ERICO CRITEC multi-phase surge diverters and other shunt-style plug-in SPD modules. The surge-distribution block 1200 may also be composed of any number of ground modules 1204. The illustrated surge-distribution block 1200 and variations thereof can manage distribution of electric currents that are typical in industrial environments.

A phase module 1202 serves to mount all or part of a SPD module 1210 and to electrically connect the mounted SPD module 1210 to the power line. In known systems, a SPD module 1210 is needed for each conductor in the power line that carries current (i.e., a conductor for each phase of the power system, and an additional conductor for a neutral line that is separate from ground, such as in TN-S systems). Thus, the surge-distribution block 1200 may have the same number of phase modules 1202 as there are current-carrying conductors in the power line; the illustrated surge-distribution block 1200 for a three-phase TN-C system has three phase modules 1202, a corresponding surge-distribution block for a three-phase TN-S system has four phase modules 1202, and a corresponding surge-distribution block for a single-phase electric power system may have as few as one phase module 1202.

In polyphase embodiments, the corresponding plurality of phase modules 1202 may horizontally abut each other, and may appear as an integrated unit together forming a single cavity in which a multiphase SPD module 1210 can be mounted. In particular, a phase module 1202 can have a housing 1220 that receives the SPD module 1210 and also encloses the other components of the phase module 1202. The housing 1220 can be a non-conductive, corrosion resistant rigid polymer or other suitable material. The housing 1220 can include arms 1222, 1224 extending upward to form a brace that retains all or a portion of the SPD module 1210 as shown. Line connection apertures 1226 may be disposed through the housing 1220 to allow connection of the power cables to the surge-distribution block 1200. A pin aperture 1260 may be disposed through the housing 1220 to allow access to a control pin interface, shown in FIG. 13A. The pin aperture 1260 may be occluded on each phase module 1202 by a tear-away tab 1262 that prevents access through the pin aperture 1260 until the tear-away tab 1262 is removed. Additional apertures can facilitate other electrical connections as described below. The front surface 1228 and/or rear surface 1230 of the housing 1220 can be substantially planar, allowing flush contact between adjacent phase modules 1202.

Figure 19:
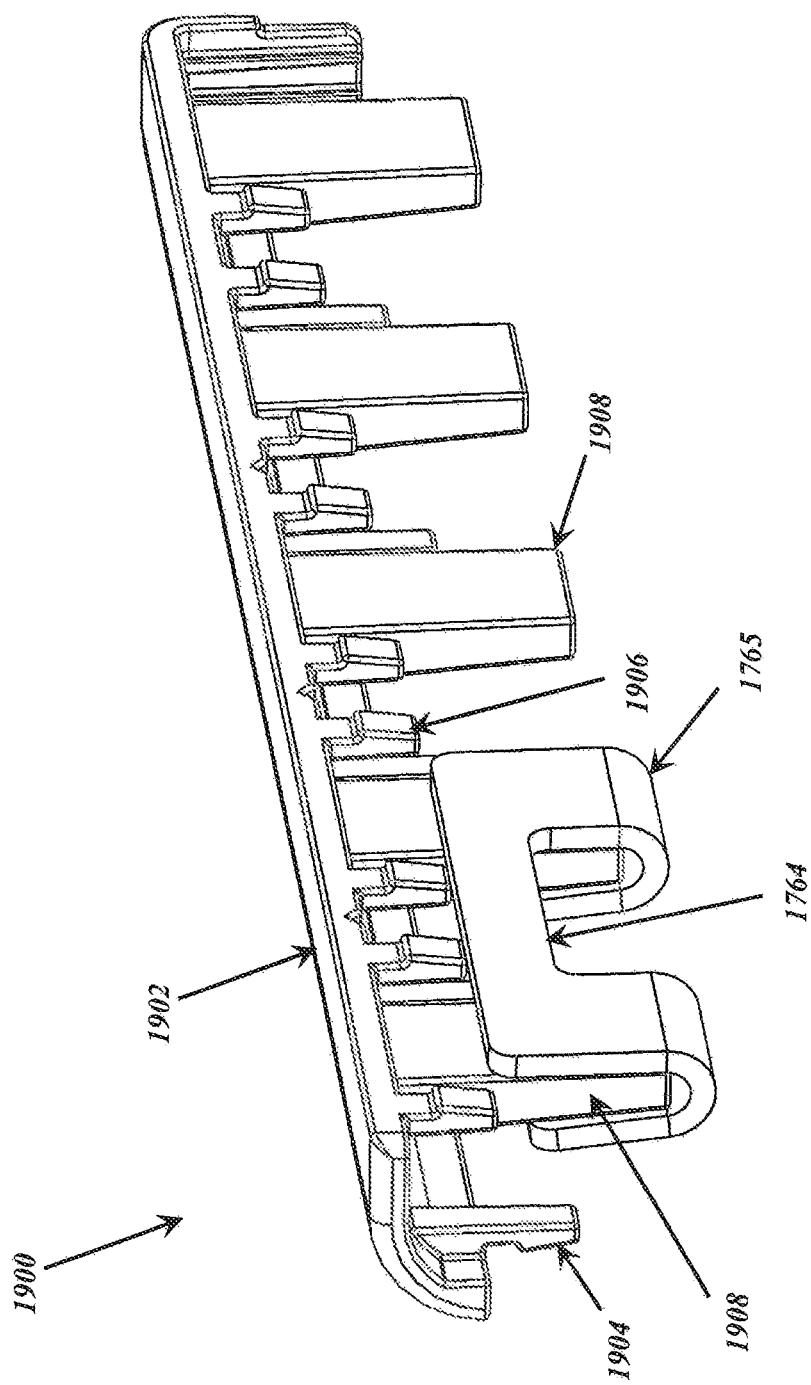
FIG. 19 is a left perspective view of a bus bar cover in accordance with the present disclosure.

The phase modules 1202 may be electrically connected to each other and to one or more ground modules 1204 of the surge-distribution block 1200. The ground module 1204 makes secure electrical and mechanical contact with a DIN rail to provide an electrical ground for the power line via the surge-distribution block 1200. The ground module 1204 can include a housing 1240 that encloses the other components of the ground module 1204. The housing 1240 can be a non-conductive, corrosion resistant rigid polymer or other suitable material, and can include apertures for facilitating electrical contact with the phase modules 1202 and electrical and mechanical contact with the DIN rail as described further below. The front surface 1242 and/or rear surface (not shown) of the housing 1240 can be planar to facilitate flush contact with an adjacent one of the phase modules 1202, so that the surge-distribution block 1200 looks and functions like an integrated component. To further this effect, the front profile (i.e., the contour of the perimeter of the housing 1240 viewed from the front) may substantially match that of the phase module 1202, as illustrated. The modules 1202, 1204 of the surge-distribution block 1200 may be further interconnected by a bus bar cover 1250, further described below with respect to. FIG. 19, which may also cover apertures in the modules 1202, 1204 and the bus bars (not shown) installed therein.

In some embodiments, one or more signal output interfaces, such as an alarm system. connection terminal 1206, can be mechanically connected to the ground module 1204 and/or to one or more of the phase modules 1202 as needed to detect operational abnormalities and/or report them to a remote monitor. In some embodiments, the alarm system connection terminal 1206 may serve as an interface for the end user's remote monitoring signals. The surge-distribution block 1200 may have an isolated circuit to pass the input signal (from end-user) through a switch and back out the same contact block in either a normally open or normally closed terminal depending on the state(s) of the SPD module(s) 1210, as described further below.

Figure 13A:
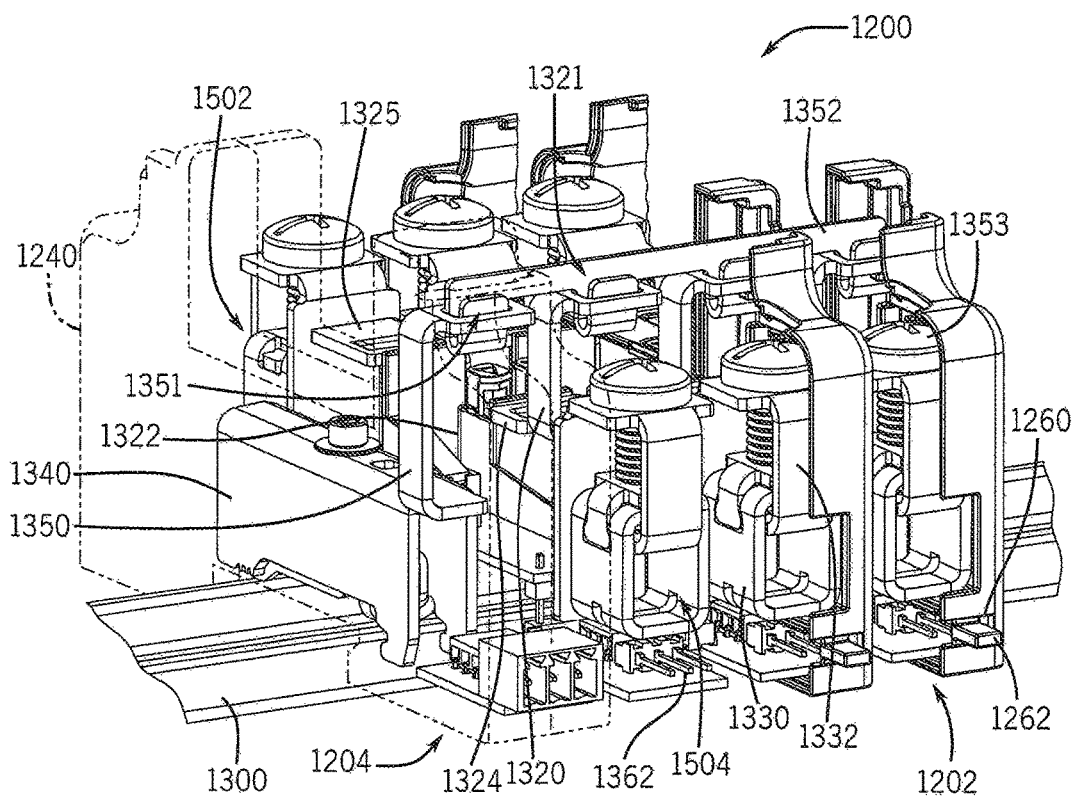
FIG. 13A is a front-left perspective partial cutaway view of the distribution block of FIG. 12 clamped to a DIN rail, shown with surge protective device (SPD) modules removed, the housings of the ground module and one of the single phase modules removed, and the housings of the other two phase modules shown in cross-section, to illustrate internal components of the ground module and the single phase module.
Figure 13B:
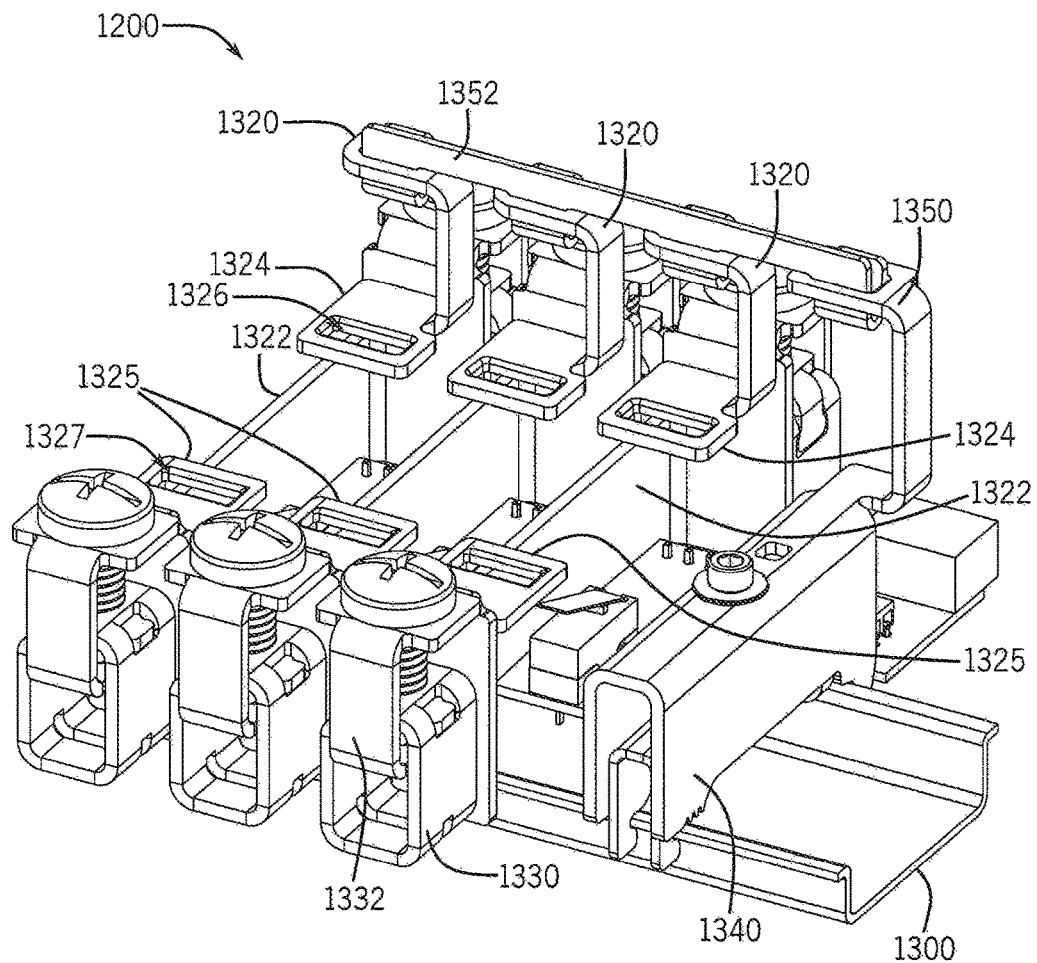
FIG. 13B is a front-right perspective view of the distribution block of FIG. 13A with all module housings removed to show internal components of the modules.

In FIGS. 13A-B, the surge-distribution block 1200 is attached to a DIN rail 1300 by way of a grounding clamp 1340 contained in the housing 1240 of the ground module 1204. The grounding clamp 1340 attached to the DIN rail 1300 in this manner provides a ground for the surge-distribution block 1200 and the power lines electrically connected, thereto, and also secures the surge-distribution block 1200 in place on the DIN rail 1300. The ground module 1204 may further include a grounding terminal 1350 that is in electrical contact with the grounding clamp 1340 and may further be integral with or mounted on the grounding clamp 1340. See FIG. 14. The grounding terminal 1350 may be a suitable metal or other conductive material that is sufficiently resilient to receive and tightly retain a bus bar 1352. In one embodiment, as illustrated, the grounding terminal 1350 may extend upward (e.g., vertically) from the grounding clamp 1340 a certain distance, and then bend so that an end portion of the grounding terminal 1350 is about parallel to the DIN rail 1300 and/or about perpendicular to the upward-extending part; this end portion may have an aperture 1351 disposed therethrough for receiving a projection 1353 of the bus bar 1352 as described below.

Similarly, each phase module 1202 may have a bus terminal 1320 oriented to receive the same bus bar 1352 connected to the grounding terminal 1350. The bus terminal 1320 can be made of a rigid, highly conductive metal (i.e. copper) or other material with suitable resilience for holding a projection 1353 of the bus bar 1352 by friction fit. The bus terminal 1320 may be disposed, parallel or at an angle to the grounding terminal 1350, and may be axially aligned with or offset from the grounding terminal 1350. In the illustrated surge-distribution block 1200, the bus terminal 1320 has the same geometry as the grounding terminal 1350, extending upward and then bending to form an end portion having an aperture 1321; the end portion of the bus terminal 1320 is aligned vertically and laterally with, and is spaced axially from, the end portion of the ground terminal 1350. In some embodiments, all such end portions of the grounding terminal 1350 and bus terminals 1320 are so aligned, and are spaced apart a uniform distance that corresponds to the distance between the projections 1353 of the bus bar 1352 described below. Alternatively, any of the terminals 1320, 1350 may attach to the bus bar 1352 with a fastener or other attachment mechanism or may be welded to the bus bar 1352 if a permanent installation is suitable.

The bus bar 1352 is a bar of rigid metal (or other conductive material), preferably copper or another highly conductive metal, having projections 1353 that fit into the bus terminals 1320 and grounding terminal 1350 and are retained there by friction fit, maintaining a good electrical connection. The projections 1353 may be any suitable size and shape that accommodates insertion into the apertures 1321, 1351 and retention therein. The illustrated example U-shape of the projections 1353 is simply formed by bending a stamped metal bus bar 1352; such a projection 1353 may deform sufficiently upon insertion to be retained by friction fit. In some embodiments, the projections 1353 may be uniformly shaped and/or uniformly spaced, while in other embodiments at least one projection 1353 varies from the others in order to indicate a proper orientation of the bus bar 1352. To interconnect all of the phase modules 1202 with the ground module 1204, the projection 1353 at the proximal end of the bus bar 1352 connects to the grounding terminal 1350 within the housing 1240. The bus bar 1352 exits the housing 1240 and extends through the phase modules 1202, each adjacent projection 1353 being retained in the bus terminal 1320 of the corresponding phase module 1202. The bus bar 1352 may formed from a single piece of conductive sheet metal in some embodiments, and in some embodiments may have surface features that contribute to establishing and maintaining good electrical contact with the terminals 1320, 1350.

The phase module 1202 can further include one or more SPD terminals 1324, 1325 for receiving and retaining an SPD module 1210. The SPD terminals 1324, 1325, like the bus terminal 1320, can be made of a rigid, highly conductive metal (i.e. copper) or other material with suitable resilience for holding an SPD module 1210 by friction fit and establishing a sound electrical connection to the SPD module 1210. In one embodiment, each SPD terminal 1324, 1325 may have a corresponding aperture 1326, 1327 that receives a connecting prong, of the SPD module 1210. One SPD terminal 1324 electrically, and optionally physically, connects to the bus terminal 1320 to establish a ground contact. In one embodiment, the SPD terminal 1324 and bus terminal 1320 may be stamped into the same piece of conductive sheet metal and then bent to form, with the bus terminal 1320 extending upward from the SPD terminal 1324. The other SPD terminal 1325 electrically, and optionally physically, connects to a splice block 1322 of the phase module 1202. The splice block 1322 is a conductive metal (e.g., copper) component that connects to one or more power lines from the power source at an input side 1502 of the phase module 1202, and connects to power lines that run to the powered device at an output side 1504 of the phase module 1202. For example, power lines may be disposed through the line connection apertures 1226 of each phase module 1202 and electrically connected to the splice block 1322. In operation, the splice block 1322 will carry the power line current from the incoming power lines (i.e., attached to the surge-distribution block 1200 on the input side 1502) through to the outgoing power lines (i.e., attached to the surge-distribution block 1200 on the output side 1504); the SPD terminal 1325 will receive the power line current from the splice block 1322 and communicate the power line current to the SPD module 1210, while the SPD terminal 1324 grounds the SPD module 1210 and splice block 1322 and so should have a good electrical connection.

In some embodiments, such as the embodiment of FIGS. 1-11, a splice block of a phase module may be machined from a block of conductive material. However, the cost of doing so using a preferred conductive material such as copper can be very high. The manufacturing cost of the surge-distribution block 1300 is comparatively reduced by stamping the splice block 1322 into a much smaller sheet of copper or other conductive material. In addition, while embodiments have been described wherein one or more of the terminals may be welded or otherwise attached to the splice block, the SPD terminal 1325 that connects to the splice block 1322 may be integrally formed (e.g., by stamping) with the splice block 1322 and then bent to form. A piece to form the SPD terminal 1324 and bus terminal 1320 may be simultaneously stamped as described above, to further reduce manufacturing time and costs. The stamping and bending process may further include forming the ends of the splice block 1322 into power cable connection ports 1330. The connection ports 1330 may be configured (i.e., with a suitable shape and perimeter and additional stampings to connect components) to receive a screw-type terminal block 1332 or another suitable terminal block for securing a power cable to the connection port 1330.

FIG. 13A further illustrates the control pin interface 1362 accessible through the pin aperture 1260 after the tab 1262 is removed. Electrical components may not need to be connected to the control pin interface 1362 of every phase module 1202 in the surge-distribution block 1200. Instead, such components may be connected after the surge-distribution block 1200 is assembled or during its installation. For example, in the illustrated three-phase power surge-distribution block 1200, the control pin interface 1362 of each phase module 1202 is connected in series to the connection terminal 1206 of the ground module 1204 (see FIG. 12); the tab 1262 of the last phase module 1202 in the series can be removed, and a jumper (not shown) placed over the middle and right pins of the corresponding control pin interface 1362 in order to close the electric circuit.

Figure 14:
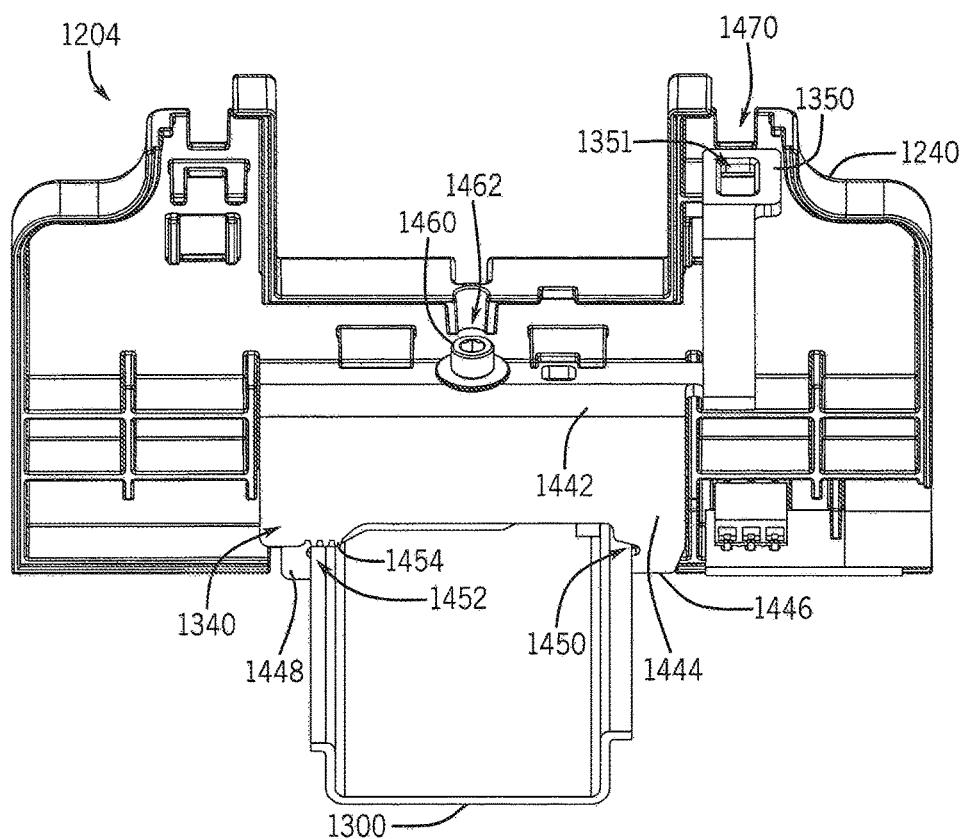
FIG. 14 is a top-front perspective view of a ground module of the distribution block of FIG. 12, shown with the housing in cross-section and with a ground clamp attached to the DIN rail as in FIG. 13A.

FIG. 14 illustrates the components of the ground module 1204. A bar 1442, which may be any suitable metal or another rigid conductive material, has a body 1444, a first leg 1446 integral with the body 1444, and a second leg 1448 integral with the body 1444. The legs 1446, 1448 extend from the body 1444 downward (i.e., toward the DIN rail 1300) and contact the DIN rail 1300. A first detent 1450, which may be a groove at or near the top of the first leg 1446, receives and retains one end of the DIN rail 1300 in both electrical and mechanical contact. The DIN rail 1300 may be retained in the detent 1450 by friction fit or by way of a fastener (not shown). A second detent 1452 forms a groove at or near the top of the second leg 1448. The opposite end of the DIN rail 1300 is retained in the second detent 1452 in both mechanical and electrical contact with the bar 1442. A set screw 1460 may be rotated to tighten the clamping force against the DIN rail 1300 as described above. A set screw aperture 1462 may be disposed through the housing 1240 to provide access to the set screw 1460. One or more teeth 1454 may be formed into the surface of the bar 1442, such as on the bottom surface of the body 1444, to provide additional electrical and/or mechanical contact of the bar 1442 with the DIN rail 1300.

At least one terminal, for making electrical contacts to the phase module(s) of the surge-distribution block, may be attached to or integral with the bar 1442 or another conductive element of the ground clamp 1340. In one embodiment, the grounding terminal 1350 may be integral with the ground clamp 1340. For example, the grounding terminal 1350 and the bar 1442/body 1444 may be stamped into a sheet of conductive material and then bent into form so that the grounding terminal 1350 extends upward from the bar 1442, terminating in the bent end portion described above. The aperture 1351 of the grounding terminal 1350 may align with a bus bar aperture 1470 disposed through the housing 1240, and the bus bar may be inserted through the bus bar aperture 1470 to attach to the grounding terminal 1350 as illustrated in FIGS. 13A-B.

Figure 15A:
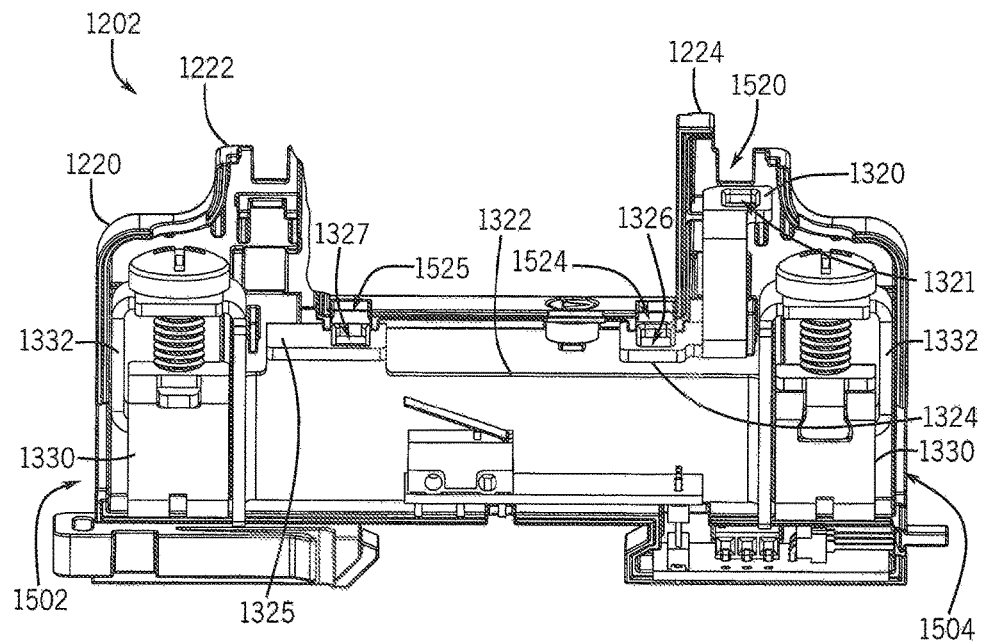
FIG. 15A is a top-front perspective view of a phase module of the distribution block of FIG. 12, shown with the housing in cross-section.

FIG. 15A illustrates the components of a phase module 1202 via cutaway at the vertical midsection of the housing 1220. The splice block 1322 extends from one or more apertures through the housing 1220 at the input side 1502 to corresponding apertures at the output side 1504. Power cables are inserted through these apertures into the connection ports 1330 and secured with terminal blocks 1332. One of the SPD terminals 1324 may electrically connect to the bus terminal 1320, grounding any SPD module inserted into the phase module 1202. The other SPD terminal 1325 may electrically connect to the splice block 1322. In some embodiments, apertures in the housing 1220 of the phase module 1202 facilitate installation of the bus bar and the SPD module as described above. For example, the bus terminal 1320 can be accessible through a bus aperture 1520 and the SPD terminals 1324, 1325 can be accessible through SPD apertures 1524, 1525; the apertures 1520, 1524, 1525 through the housing 1220 may be vertically aligned with corresponding apertures 1321, 1326, 1327 in the terminals 1320, 1324, 1325 to facilitate these connections.

Figure 15B:
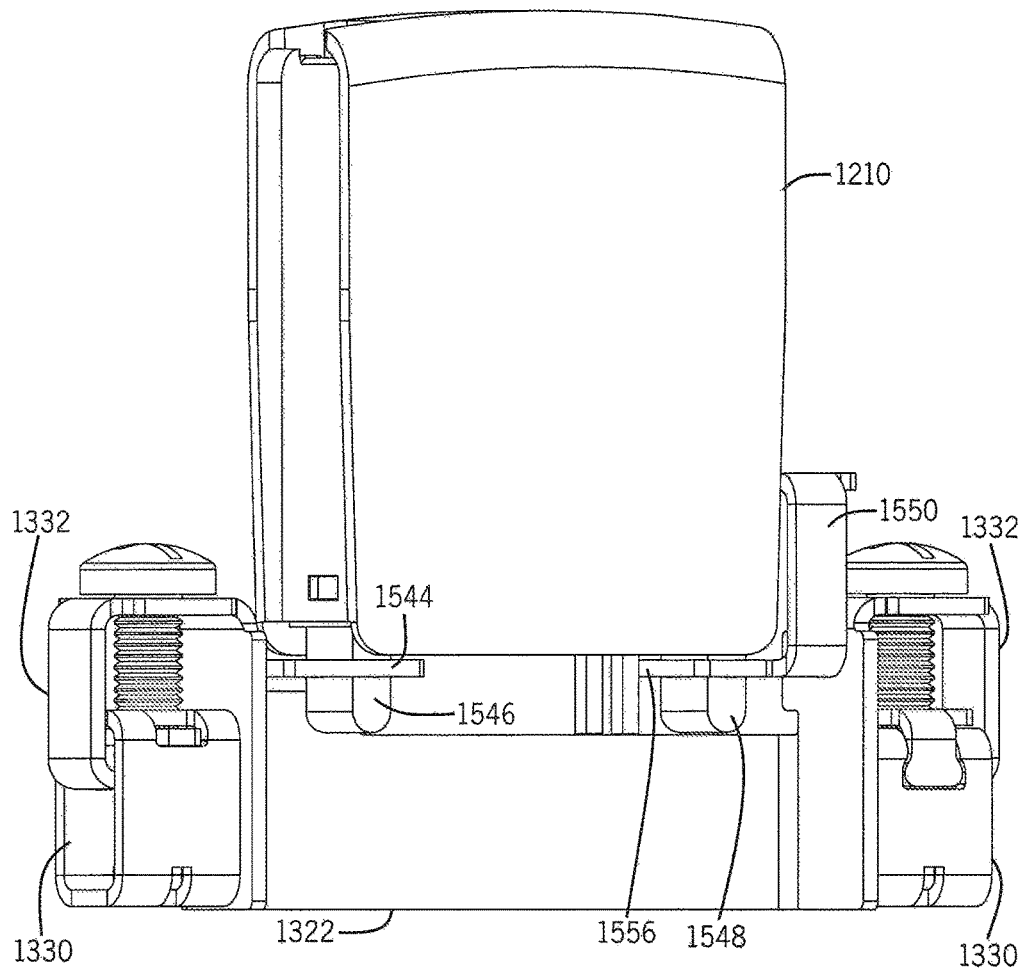
FIG. 15B is a front-right perspective view of the phase module of FIG. 15A with the housing removed and a SPD module attached.

FIG. 15B illustrates an example of an inserted SPD module 1210, with the phase module housing removed for clarity. A first of the SPD terminals 1544 is integral with the splice block 1322 as described above, and is bent to about perpendicular to the splice block 1322. The SPD terminal 1544 receives a connector 1546 of the SPD module 1210, such as a conductive prong that deforms when inserted into the SPD terminal 1544 so it is retained by friction fit. The other SPD terminal 1556 retains another connector 1548 of the SPD module 1210 in the same manner. The SPD terminal 1556 may be electrically connected to the bus terminal 1550; for example, the SPD terminal 1556 and the bus terminal 1550 may be integral as described above. The bus terminal 1550 and SPD terminal 1556 may be electrically isolated from the splice block 1322, such as by being mounted on a portion of the housing of the phase module.

Figure 16:
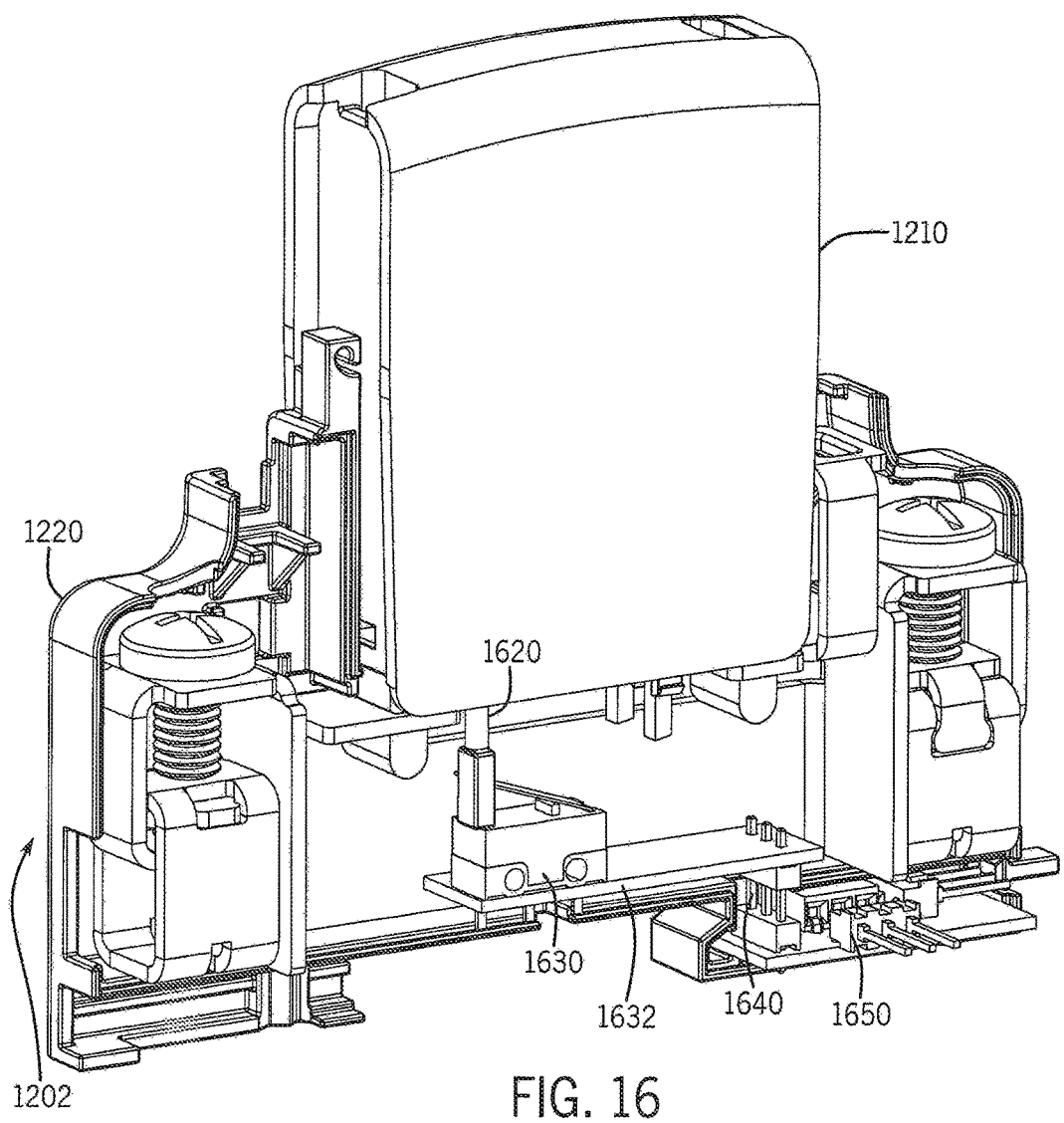
FIG. 16 is a top-front perspective view of a SPD module attached to a phase module in accordance with the disclosure, shown with the phase module housing in cross-section.
Figure 17:
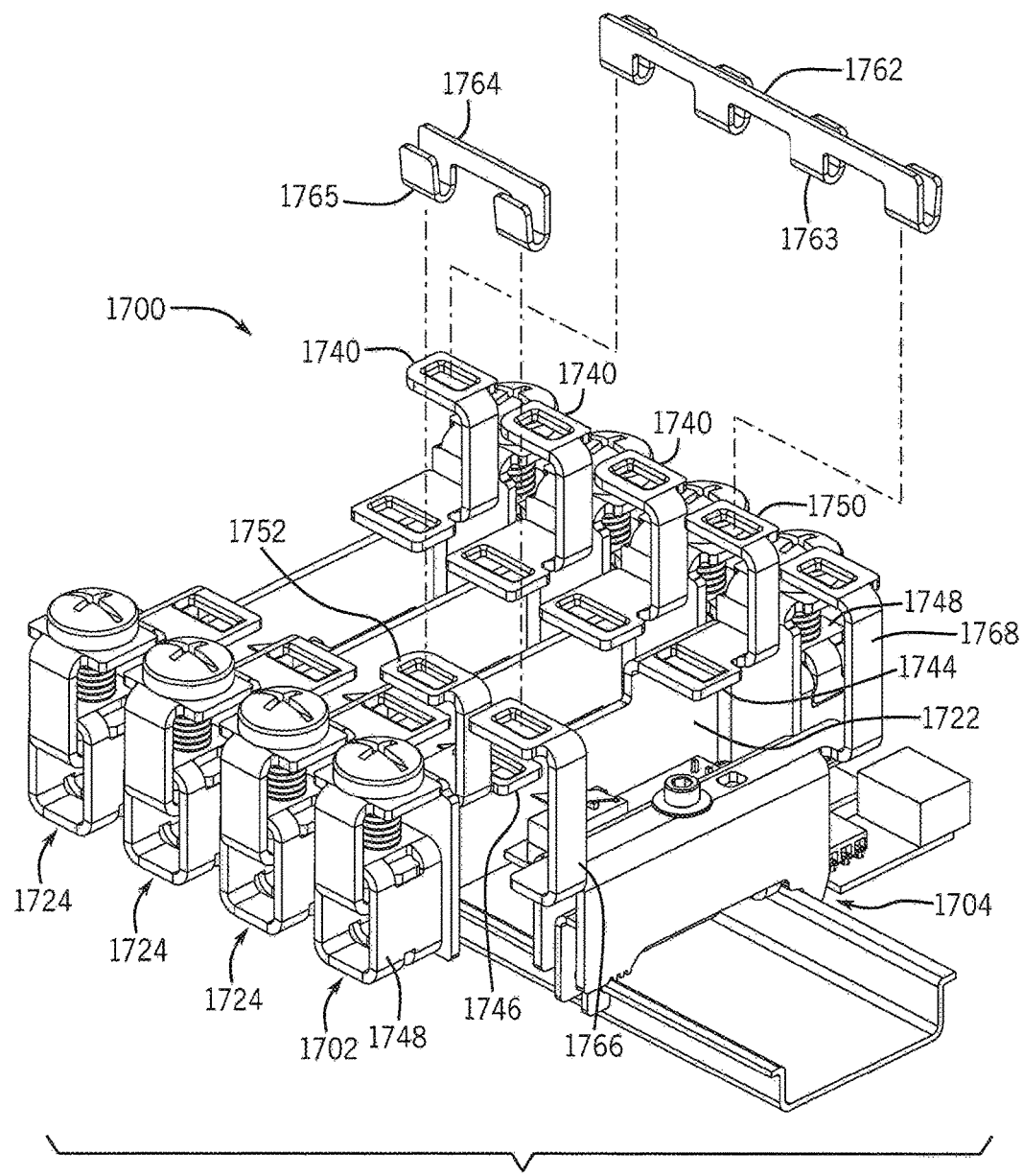
FIG. 17 is a front-right perspective view of another embodiment of a distribution block having a TN-S configuration, with all module housings removed to show internal components of the modules.
Figure 18:
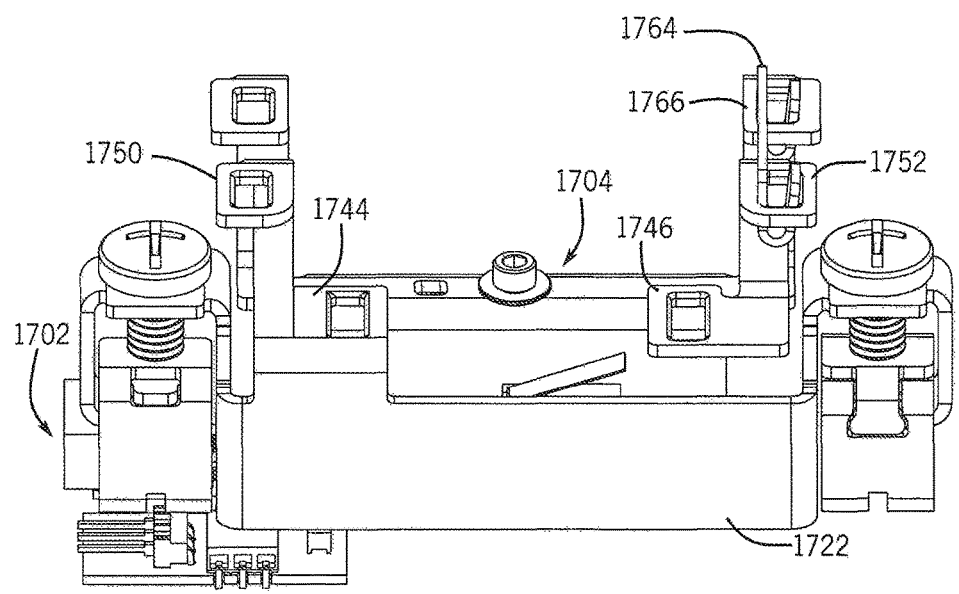
FIG. 18 is a top-front perspective view of a neutral phase module of the distribution block of FIG. 17, shown with the housing removed and with a connection to a ground terminal of a ground module in accordance with the present disclosure.

Referring to FIG. 16, the phase module 1202 may further include mechanical and electronic components that enable connection of the phase module 1202 to a monitoring system. In various embodiments, the phase module 1202 can transmit data to the monitoring system, which can then process the data and activate corresponding alarms, messages, reporting tasks, data recordation tasks, and the like. In one embodiment, the phase module 1202 may include a switching device 1630 positioned to interact with a pin 1620 of the SPD module 1210. The switching device 1630 may include a mechanical or electrical switch, circuit components for detecting the position of the switch, and circuit components for transmitting a signal describing the state of the switch. The switching device 1630 may, for example, be connected by conductive traces in a printed circuit board 1632 to connecting pins 1640. The pins 1640 may in turn electrically connect to an interface, such as a pin connector 950, that extends out of the housing 1220 and receives a corresponding connector for a device in the monitoring system. Alternatively, the interface may communicate with the monitoring system wirelessly. These interconnected components cooperate with the SPD module 1210 and pin 1620 to alert the monitoring system to the end-of-life of the SPD module 1210 as described above with respect to FIG. 9.

Where the embodiments of FIGS. 13A-B pertain to TN-C configurations, FIGS. 17 and 18 illustrate a TM-S configuration of a surge-distribution block 1700, which has four phase modules 1724, 1702 and a ground module 1704 each shown with the housings hidden to illustrate the internal connections. The three power phase modules 1724 are interconnected as described above. A fourth phase module is a neutral phase module 1702. The neutral phase module 1702 may have a neutral terminal 1750 that connects via neutral bus bar 1762 to the bus terminals 1740 of the power phase modules 1724 (i.e., via insertion of the projections 1763). The neutral terminal 1750 may be electrically connected to one of the SPD terminals 1744 as described above. The SPD terminal 1744 and the neutral terminal 1750 may be electrically connected to, and further may be integral with, a neutral splice block 1722 that connects to input and output power cables at cable connectors 1748.

The neutral phase module 1702 may further include a ground terminal 1752 that is electrically connected to the other SPD terminal 1746. The ground terminal 1752 and SPD terminal 1746 may be mounted on the nonconductive housing of the neutral phase module 1702 so that they are electrically isolated from the neutral splice block 1722 as described above. The ground terminal 1752 may electrically connect by ground bus bar 1764 to a grounding terminal 1766 of the grounding module 1704 as described above (i.e., via insertion of the projections 1765). In some embodiments, therefore, the neutral phase module 1702 may have bus terminals (i.e., neutral terminal 1750 and ground terminal 1752) in two locations, such as approximate opposing ends of the splice block 1722. As shown in FIG. 17, an embodiment of the ground module 1704 may include two grounding terminals 1766, 1768, respectively aligned with the ground terminal 1752 of the neutral phase module 1702 and with the bus terminals of the phase modules (as in the embodiment of FIG. 12). This allows a single version of the ground module 1704 to be produced and used in surge-distribution blocks with either a TN-C or a TN-S configuration.

FIG. 19 illustrates an example bus bar cover 1900 similar to the cover 1250 of FIG. 12. The bus bar cover 1900 may be a suitable plastic material, such as the same material comprising the housings of each of the modules described above. The cover 1900 may be a single cast or molded part, or may be assembled from discrete parts. A cover body 1902 may have a smooth outer surface that may conform to the profile of the surge-distribution block; in some embodiments, the outer surface may be curved, while in others it may be planar. A plurality of outer tabs 1904 and a plurality of inner tabs 1906 may attached to corresponding receiving structures in the housing of the phase and ground modules to attach the cover 1900. A plurality of projections 1908 may extend away from the cover body 1902. The projections 1908 may be sized and shaped to fit within the projections of any of the bus bars described above (e.g., projections 1765 of bus bar 1764 as shown). These cooperative structures help position the bus bar for insertion, while also providing resistance to the projections' deformation during insertion, so that the projections fit tighter. The cover 1900 has an appropriate length and number of projections for the configuration of the surge-distribution block: for a TN-C configuration, as in FIG. 12, a cover 1250 may be shorter and have four projections, while the cover 1900 of FIG. 19 is longer and has five projections 1908 for use in a TN-S configuration (e.g., of FIG. 17).

The presently disclosed apparatuses integrate a distribution block with a shunt style SPD. The apparatuses are modular, allowing for common sub-assembly units to mate together creating several variations of the apparatus for power systems with different requirements. In some embodiments, the modules of the apparatus include a phase module and a ground module. The phase module includes a conductive metal splice block electrically connected to the power lines and to a removable SPD module. The conductive metal splice block can be designed with stamped metal terminals for connection to the SPD module and to a ground bus bar. The ground bus bar electrically and mechanically connects all phase modules to an end-mounted ground module. The ground module utilizes a clamp electrically connected to the ground bus bar and to a DIN rail to ground the entire apparatus through the DIN rail.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An apparatus for distributing power and providing surge protection in a high-current power system, the apparatus comprising:
   a ground module comprising:
      a first housing;
      an electrically conductive grounding clamp disposed in the first housing and configured to electrically and mechanically connect to a DIN rail; and
      a grounding terminal electrically connected to the grounding clamp;
   a plurality of power phase modules each configured to conduct one phase of a polyphase electric current, each of the plurality of power phase modules comprising:
      a second housing that mechanically retains a corresponding surge protective device (SPD) module of a plurality of SPD modules;
      an electrically conductive first splice block disposed in the second housing and configured to electrically connect to:
         an input side conductor that carries the corresponding phase of the polyphase electric current; and
         an output side conductor that carries current'to a powered device;
      a first SPD terminal integral with the first splice block and configured to electrically connect to the corresponding SPD module retained by the second housing;
      a bus terminal disposed in the second housing and electrically isolated from the first splice block; and
      a second SPD terminal disposed in the second housing, electrically connected to the bus terminal, and configured to electrically connect to the corresponding SPD module retained by the second housing to form a surge protection circuit within the apparatus; and
   an electrically conductive, rigid first bus bar attachable to the grounding terminal and to the corresponding bus terminal of each of the plurality of power phase modules to connect the corresponding surge protection circuit of each of the plurality of power phase modules to ground.

2. The apparatus of claim 1, wherein the first bus bar removably attaches to the grounding terminal and the corresponding bus terminal of each of the one or more power phase modules, the first housing and the corresponding second housing of each of the one or more power phase modules comprising a bus aperture through which the bus bar is disposed.

3. The apparatus of claim 1, further comprising:
   a neutral phase module that connects to a neutral line of the power system, the neutral phase module comprising:
      a third housing;
      an electrically conductive second splice block disposed in the third housing and configured to electrically connect to the neutral line;
      a third SPD terminal and a fourth SPD terminal disposed in the third housing and configured to electrically connect to one of the one or more SPD modules, the third SPD terminal being, electrically connected to the second splice block;

a neutral terminal electrically connected to the third SPD terminal, wherein the first bus bar is attachable between the grounding terminal and the corresponding bus terminal of each of the plurality of power phase modules; and a ground terminal electrically isolated from the second splice block and electrically connected to the fourth SPD terminal; and a conductive, rigid second bus bar attachable to the grounding terminal of the grounding module and to the ground terminal of the neutral phase module.

4. The apparatus of claim 3, wherein the first housing, the corresponding second housings of the plurality of power phase modules, and the third housing have planar front and rear surfaces and cooperating front profiles.

5. A distribution block for a high-current power system, the distribution block comprising:

an electrically conductive grounding clamp configured to electrically and mechanically connect to a DIN rail and to retain the distribution block in place with respect to the DIN rail;

an electrically conductive bus terminal;

an electrically conductive, rigid bus bar that electrically connects to the grounding clamp and to the bus terminal;

a conductive splice block configured to electrically connect, at an input side of the distribution block, to a first power cable that carries a line current from a power supply, and to electrically connect, at an output side of the distribution block, to a second power cable that carries the line current to a powered device; and a first surge protective device (SPD) terminal, and a second SPD terminal configured to together receive and electrically connect to an. SPD module, such connection forming a surge protection circuit within the distribution block, the first SPD terminal electrically connecting to the bus terminal and the second SPD terminal electrically connecting to the splice block.

6. The distribution block of claim 5, wherein the first SPD terminal and the bus terminal are electrically isolated from the splice block.

7. The distribution block of claim 5, wherein the bus bar connects the surge protection circuit to ground, cooperates with the grounding clamp to retain the distribution block in place with respect to the DIN rail, and is removable.

8. The distribution block of claim 5, wherein the splice block is machined from a block of copper.

9. The distribution block of claim 5, wherein the splice block is formed from a sheet of conductive material.

10. The distribution block of claim 9, wherein the second SPD terminal is integral with the splice block and is formed from the sheet of conductive material.

11. The distribution block of claim 5, further comprising a grounding terminal electrically connected to the grounding clamp, wherein to electrically connect to the grounding clamp and the bus terminal, the bus bar mechanically attaches to the bus terminal and to the grounding terminal.

12. The distribution block of claim 11, wherein the grounding terminal is integral with the grounding clamp.

13. The distribution block of claim 11, wherein the bus bar removably attaches to the bus terminal and to the grounding terminal.

14. The distribution block of claim 13, further comprising a bus bar cover that is disposed over the bus bar and the bus terminal and must be removed to remove the bus bar from the bus terminal.

15. The distribution block of claim 5, wherein the splice block, the bus terminal, and the first and second SPD terminals are disposed in a phase module housing that retains the SPD module, the first phase module housing comprising a plurality of apertures together allowing the first power cable, the second power cable, the bus bar, and one or more connectors of the SPD module to extend into the first phase module housing.

16. An apparatus for distributing power and providing surge protection in a high-current power system, the apparatus comprising:

a ground module comprising:
a first housing;
an electrically conductive grounding clamp disposed in the first housing and configured to electrically and mechanically connect to a DIN rail; and
a grounding terminal electrically connected to the grounding clamp; and one or more power phase modules each comprising:
a second housing configured to receive all or a portion of a corresponding surge protective device (SPD) module of one or more SPD modules;
an electrically conductive first splice block disposed in the second housing and configured to electrically connect to an input side conductor that carries current from a power supply, and to an output side conductor that carries current to a powered device;
a first SPD terminal disposed in the second housing, electrically connected to the first splice block, and configured to electrically connect to the SPD module;
a bus terminal electrically isolated from the first splice block and configured to electrically connect to the grounding terminal; and
a second SPD terminal disposed in the housing, electrically connected to the bus terminal, and configured to electrically connect to the SPD module.

17. The apparatus of claim 16, further comprising an electrically conductive, rigid bus bar that mechanically attaches to the grounding terminal and to the corresponding bus terminal of each of the one or more power phase modules.

18. The apparatus of claim 17, wherein the bus bar removably attaches to the grounding terminal and the corresponding bus terminal of each of the one or more power phase modules, the corresponding second housing of each of the one or more power phase modules comprising a bus aperture through which the bus bar is disposed.

19. The apparatus of claim 16, further comprising a neutral phase module that connects to a neutral line of the power supply, the neutral phase module comprising:

a third housing;
an electrically conductive second splice block disposed in the third housing and configured to electrically connect to the neutral line;
a third SPD terminal and a fourth SPD terminal disposed in the third housing and configured to electrically connect to one of the one or more SPD modules, the third SPD terminal being electrically connected to the second splice block;

a neutral terminal electrically connected to the third SPD terminal and configured to electrically connect to the corresponding bus terminal of one of the one or more power phase modules; and a ground terminal electrically isolated from the second splice block and configured to electrically connect to the grounding terminal of the grounding block.

20. The apparatus of claim 19, further comprising:

an electrically conductive, rigid first bus bar that mechanically attaches to the neutral terminal and to the corresponding bus terminal of each of the one or more power phase modules; and an electrically conductive, rigid second bus bar that mechanically attaches to the ground terminal of the neutral phase module and to the grounding terminal of the grounding module.

* * * * *